(12) United States Patent
Shasha et al.

(10) Patent No.: US 8,458,451 B2
(45) Date of Patent: Jun. 4, 2013

(54) DATABASE OUTSOURCING WITH ACCESS PRIVACY

(75) Inventors: Dennis Shasha, New York, NY (US);
Peter Williams, East Setauket, NY (US);
Radu Sion, Stony Brook, NY (US)

(73) Assignee: New York University, New York, NY (US)

( * ) Notice: Subject to any disclaimer, the term of this patent is extended or adjusted under 35 U.S.C. 154(b) by 1172 days.

(21) Appl. No.: 12/321,326

(22) Filed: Jan. 20, 2009

(65) Prior Publication Data

US 2010/0185847 A1 Jul. 22, 2010

(51) Int. Cl.
*H04L 29/06* (2006.01)

(52) U.S. Cl.
USPC .......................................... 713/150; 707/781

(58) Field of Classification Search
None
See application file for complete search history.

(56) References Cited

U.S. PATENT DOCUMENTS

| | | | |
|---|---|---|---|
| 2003/0135507 A1* | 7/2003 | Hind et al. | 707/100 |
| 2006/0123249 A1* | 6/2006 | Maheshwari et al. | 713/193 |
| 2008/0034268 A1* | 2/2008 | Dodd et al. | 714/755 |
| 2008/0183656 A1* | 7/2008 | Perng et al. | 707/2 |
| 2010/0088512 A1* | 4/2010 | Schwartz et al. | 713/168 |
| 2010/0198914 A1* | 8/2010 | Gehrke et al. | 709/203 |

* cited by examiner

*Primary Examiner* — David Pearson
(74) *Attorney, Agent, or Firm* — Ansel M. Schwartz

(57) ABSTRACT

This invention introduces a new paradigm for outsourcing the transaction processing backend of a multi-client database application to an untrusted service provider. Specifically, the invention enables untrusted service providers to support transaction serialization, backup and recovery for clients, with full data confidentiality and correctness. Moreover, providers learn nothing about transactions (except their size and timing), thus achieving read and write access pattern privacy.

32 Claims, 9 Drawing Sheets

DATABASE OUTSOURCING WITH ACCESS PRIVACY

FIELD OF THE INVENTION

The present invention is related to storing copies of data involving a plurality of clients and a server that has a shared memory in communication with the clients where the clients can understand the data but the server cannot understand the data, and the data that is shared is a desired copy. (As used herein, references to the "present invention" or "invention" relate to exemplary embodiments and not necessarily to every embodiment encompassed by the appended claims.) More specifically, the present invention is related to storing copies of data involving a plurality of clients and a server that has a shared memory in communication with the clients where the clients can understand the data but the server cannot understand the data, and the data that is shared is a desired copy utilizing an encrypted transaction log.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Increasingly, data management is outsourced to third parties. This trend is driven by growth and advances in cheap, high-speed communication infrastructures as well as by the fact that the total cost of data management is 5-10 times higher than the initial acquisition costs [34].

Outsourcing has the potential to minimize client-side management overheads and benefit from a service provider's global expertise consolidation and bulk pricing. Providers such as Yahoo Briefcase, Amazon Elastic Compute Cloud, Amazon Simple Storage Service, Amazon Web Services, Google App Engine, Sun Utility Computing, and others ranging from corporate-level services such as the IBM Data Center Outsourcing Services to personal level database hosting—are rushing to offer increasingly complex storage and computation outsourcing services.

Yet, significant challenges lie in the path of a successful large-scale adoption. In business, health care and government frameworks, clients are reluctant to place sensitive data under the control of a remote, third-party provider, without practical assurances of privacy and confidentiality. Yet today's privacy guarantees of such services are at best declarative and often subject customers to unreasonable fine-print clauses—e.g., allowing the server operator (or malicious attackers gaining access to its systems) to use customer behavior and content for commercial, profiling, or governmental surveillance purposes [29]. These services are thus fundamentally insecure and vulnerable to illicit behavior.

Existing research addresses several important outsourcing aspects, including direct searches on encrypted data, and techniques for querying remotely-hosted encrypted structured data in a unified client model [32, 61]. These efforts are based on the assumption that, to achieve confidentiality, data will need to be encrypted before outsourcing to an untrusted provider. Once encrypted however, inherent limitations in the types of primitive operations that can be performed on encrypted data by untrusted hosts lead to fundamental expressiveness constraints of the allowable types of queries. Specifically, reasonably practical mechanisms exist only for simple selection and range queries or variants thereof.

The present invention is directed to a mechanism for collaborative transaction processing with durability guarantees supported by an untrusted service provider under assurances of confidentiality and access privacy. In effect, the cost benefits of standard outsourcing techniques (durability, transaction processing, availability) are achieved while preserving the privacy guarantees of local data storage. Clients to interact through an untrusted service provider that offers durability and transaction serializability support, while being able to check whether the service provider is misbehaving.

In this context data outsourcing becomes a setting in which data is hosted permanently off-site where it is securely encrypted, yet clients access it through their locally-run database effectively acting as a data cache. If local data is lost, it can be retrieved from the offsite repository. Inter-client interaction and transaction management (primarily for transactions that change data) is intermediated by the untrusted provider which also ensures durability by maintaining a client-encrypted and authenticated transaction log with full confidentiality.

In the present invention, each client maintains its own cache of (all or portions of) the database in client-local storage, allowing it to perform reads efficiently and with privacy, while relieving local system administrators of backup obligations. Additional benefits include achieving data and transaction privacy while (1) avoiding the requirement for persistent client storage (clients are now allowed to fail or be wiped out at any time), (2) avoiding the need to keep any single client-side machine online as a requirement for availability Previous methods, while containing many excellent ideas, fail to accomplish the principal goals of the present invention: (i) allow arbitrary database queries and (ii) ensure access privacy, meaning the untrusted outsourcing agent cannot infer which data is accessed or even whether two transactions access the same data, (iii) while the outsourcing agent provides durability and serializability services.

As mentioned above, outsourcing database administration and backup has emerged as a technique to reduce costs in the last several years. A principal impediment to this idea is the perceived lack of security at the outsourced sites where both external hackers and internal industrial spies might steal data. For this reason, several groups propose enhancing security through encryption.

Hacigumus et al. [41] propose a method to execute SQL queries over partly obfuscated outsourced data. The data is divided into secret partitions and queries over the original data can be rewritten in terms of the resulting partition identifiers; the server can then perform parts of the queries directly. The information leaked to the server is claimed to be 1-out-of-s where s is the partition size. This balances a trade-off between client-side and server-side processing, as a function of the data segment size. At one extreme, privacy is completely compromised (small segment sizes) but client processing is minimal. At the other extreme, a high level of privacy can be attained at the expense of the client processing the queries in their entirety. Moreover, in [44] the authors explore optimal bucket sizes for certain range queries. Similarly, data partitioning is deployed in building "almost"-private indexes on attributes considered sensitive. An untrusted server is then able to execute "obfuscated range queries with minimal information leakage". An associated privacy-utility trade-off for the index is discussed. The main drawbacks of these solutions lie in their computational impracticality and inability to provide strong confidentiality.

Recently, Ge et al. [73] discuss executing aggregation queries (a special type of query) with confidentiality on an untrusted server. Unfortunately, due to the use of extremely expensive homomorphisms (Paillier [64, 65]) this scheme leads to impractically large processing times for any reasonably security parameter settings (e.g., for 1024 bit of security, processing would take over 12 days per query). Current homomorphisms are simply not fast enough to be usable for practical data processing.

In a publish-subscribe model (a specialized form of a database), Devanbu et al. deployed Merkle trees to authenticate data published at a third party's site [32], and then explored a general model for authenticating data structures [56, 57]. Hard-to-forge verification objects are provided by publishers to prove the authenticity and provenance of query results.

Mykletun [61] introduce mechanisms for efficient integrity and origin authentication for simple selection predicate query results (a special form of query). The authors explore Different signature schemes (DSA, RSA, Merkle trees [59] and BGLS [25]) as potential alternatives for data authentication primitives.

Mykietun et al. [33] introduce signature immutability for aggregate signature schemes. The goal is to defeat a frequent querier that could eventually gather enough signatures data to answer other (un-posed) queries. The authors explore the applicability of signature-aggregation schemes for efficient data authentication and integrity of outsourced data. The considered query types are simple selection queries.

Similarly, in [54], digital signature and aggregation and chaining mechanisms are deployed to authenticate simple selection and projection operators. While these are important to consider, their expressiveness is limited. A more comprehensive, query-independent approach is desirable. Moreover, the use of strong cryptography renders this approach less useful because of the expense. Often simply transferring the data to the client side will be faster.

In [66] verification objects VO are deployed to authenticate simple data retrieval in "edge computing" scenarios, where application logic and data is pushed to the edge of the network, with the aim of improving availability and scalability. Lack of trust in edge servers mandates validation for their results—achieved through verification objects. Authentication ensures integrity of the data but not privacy.

In [45] Merkle tree and cryptographic hashing constructs are deployed to authenticate the result of simple range queries in a publishing scenario in which data owners delegate the role of satisfying user queries to a third-party un-trusted publisher (a very special form of a database). Additionally, in [55] virtually identical mechanisms are deployed in database outsourcing scenarios.

[31] proposes an approach for signing XML documents allowing untrusted servers to answer certain types of path and selection queries.

The drawbacks of these efforts include the fact that they operate in unrealistic "semi-honest" adversarial models. As a result, for example, data updates are not handled properly and the mechanisms are vulnerable to forking attacks. A forking attack occurs when a dishonest server effectively creates different data worlds for different clients. One way to do this is to show some transactions to one client and other transactions to the other.

Sion has explored query correctness by considering the query expressiveness problem in [70] where a novel method for proofs of actual query execution in an outsourced database framework for arbitrary queries is proposed. The solution is based on a mechanism of runtime query "proofs" in a challenge—response protocol built around the ringer concept first introduced in [39]. For each batch of client queries, the server is "challenged" to provide a proof of query execution that offers assurance that the queries were actually executed with completeness, over their entire target data set. This proof is then checked at the client site as a prerequisite to accepting the actual query results as accurate. This gives a probabilistic assurance of correct behavior but does not preserve privacy.

In a different adversarial and deployment model, researchers have also proposed techniques for protecting critical DBMS structures against errors [53, 67]. These techniques deal with corruptions caused by software errors. Work on tamper proof audit logs by Snodgrass et al.[51, 69] introduces the idea of hashing transactional data with cryptographically strong one-way hash functions. This hash is periodically signed by a trusted external digital notary, and stored within the DBMS. A separate validator checks the database state against these signed hashes to detect any compromise of the audit log. If tampering is detected, a separate forensic analyzer springs into action using other hashes that were computed during previous validation runs to pinpoint when the tampering occurred and roughly where in the database the data was tampered. The use of a notary prevents an adversary, even an auditor or a buggy DBMS, from silently corrupting the database. This is meant to ensure the integrity of a database.

Encrypted Storage. Encryption is one of the most common techniques used to protect the confidentiality of stored data. Several existing systems encrypt data before storing it on potentially vulnerable storage devices or network nodes. Blaze's CFS [22], TCFS [27], StegFS [58], and NCryptfs [75] are file systems that encrypt data before writing to stable storage. NCryptfs is implemented as a layered file system [42] and is capable of being used even over network file systems such as NFS. Encryption file systems are designed to protect the data at rest, yet are insufficient to solve the outsourcing problem. For one thing, they do not allow for complex retrieval queries. For another, a malicious server is able to detect which data a client is accessing, violating client access privacy.

Integrity-Assured Storage. Tripwire [48, 49] is a user level tool that verifies file integrity at scheduled intervals of time. File systems such as I3FS [47], GFS [35], and Checksummed NCryptfs [71] perform online real-time integrity verification. Venti [68] is an archival storage system that performs integrity assurance on read-only data. Mykletun et al. [62, 63] explore the applicability of signature aggregation schemes to provide computation- and communication efficient data authentication and integrity of outsourced data.

Keyword Searches on Encrypted Data. Song et al. [72] propose a scheme for performing simple keyword search on encrypted data in a scenario where a mobile, bandwidth-restricted user wishes to store data on an untrusted server. The scheme requires the user to split the data into fixed-size words and perform encryption and other transformations. Drawbacks of this scheme include fixing the size of words, the complexities of encryption and search, the inability of this approach to support access pattern privacy, or retrieval correctness. Eu-Jin Goh [36] proposes to associate indexes with documents stored on a server. A document's index is a Bloom filter [23] containing a codeword for each unique word in the document. Chang and Mitzenmacher [28] propose a similar approach, where the index associated with documents consists of a string of bits of length equal to the total number of words used (dictionary size). Boneh et al. [24] proposed an alternative for senders to encrypt e-mails with recipients' public keys, and store this email on untrusted mail servers. Golle et al. [38] extend the above idea to conjunctive keyword searches on encrypted data. The scheme requires users to specify the exact positions where the search matches have to occur, and hence is impractical. Brinkman et al. [26] deploy secret splitting of polynomial expressions to search in encrypted XML.

BRIEF SUMMARY OF THE INVENTION

The present invention pertains to a storage system. The system comprises a network. The system comprises a server having a server memory, a server processor and a server network interface in communication with the network. The system comprises a plurality of clients. Each client has a client memory in which data is stored, a client processing unit and a client network interface in communication with the server through the network. Each of the clients has an encryption portion that enables each of the clients to securely communicate and understand data with all other clients. The server memory is shared by the clients through the network to store copies of encrypted data in the server memory from the clients. The server is unable to decrypt the encrypted data stored in the server memory. The server has a timing mechanism to ensure data that is shared is a desired copy.

The present invention pertains to a client of a storage system. The client comprises a client memory in which data is stored. The client comprises an encryption portion which encrypts and decrypts the data. The client comprises a client processing unit in communication with the memory which stores the data in the client memory according to code the processing unit executes. The client comprises a network interface in communication with the client memory through which a request for a required slot in an encrypted transaction log of a server is sent to the server and through which an allocate transaction slot response from the server is received.

The present invention pertains to a server of a storage system. The server comprises a server memory in which encrypted data from clients is stored and shared. The server memory having an encrypted transaction log, the server is not able to decrypt the encrypted data. The server comprises a server processing unit in communication with the server memory. The server comprises a server network interface which receives a request for required slot in the transaction log from a client through which an allocate transaction slot response is sent to the client.

The present invention pertains to a method for storing data. The method comprises the steps of sending an encrypted encoding of a transaction entailing updates to data, where a client processing unit of a client desires to perform those updates from a client network interface of the client through a network to a server. The server is unable to decrypt the encrypted transaction information. There is also the step of sending information about other transactions to the client from a server network interface of the server through the network.

The present invention pertains to a method of a client of a storage system. The method comprises the steps of storing data in a client memory according to code a client processing unit executes. There is the step of sending a request for a required slot in an encrypted transaction log of a server. There is the step of sending the request to the server through a client network interface. There is the step of receiving an allocate transaction slot response from the server.

The present invention pertains to a method of a server of a storage system. The method comprises the steps of storing encrypted data from clients in a server memory which a server processing unit cannot decrypt, the server memory having an encrypted transaction log. There is the step of receiving at a server network interface a request for required slot in the transaction log from a client. There is the step of sending an allocate transaction slot response to the client through the server network interface.

The present invention pertains to a storage system. The system comprises a network. The system comprises a server having a server network interface in communication with the network, a server processing unit and a server memory for storing data. The system comprises a first client and at least a second client. Each client having a client processing unit, a client memory, encryption portion and a client network interface in communication with the network. When the first client desires to perform a deterministic transaction T1 to the server and desires to perform a non-deterministic transaction T2 having core modifications M2 to the server database, the first client sends from its client network interface to the server an encrypted executable description of T1, as encrypted by the encryption portion of the first client, and an encrypted executable description of M2 as encrypted by the encryption portion of the first client. The server network interface sends information about an ordered sequence of transactions X including both deterministic and non-deterministic transactions to the second client. The client processing unit of the second client executes transactions X in the order they were sent to the server from at least the first client.

The present invention pertains to a computer readable medium storing a computer program which when executed by at least one client processing unit of a client of a storage system communicates with a server. The computer program comprises instructions for the client processing unit generated steps of storing data in a client memory. There is the step of encrypting a request for a required slot in an encrypted transaction log of the server. There is the step of sending the encrypted request to the server through a client network interface.

The present invention pertains to a computer readable medium storing a computer program which when executed by at least one server processing unit of a server of a storage system communicates with a client. The computer program comprises instructions for the server processing unit generated steps of storing encrypted data from clients in a server memory which the server processing unit cannot decrypt. The server memory having an encrypted transaction log. There is the step of receiving at a server network interface a request for a required slot in the transaction log from the client. There is the step of sending an allocate transaction slot response to the client through the server network interface.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 13:
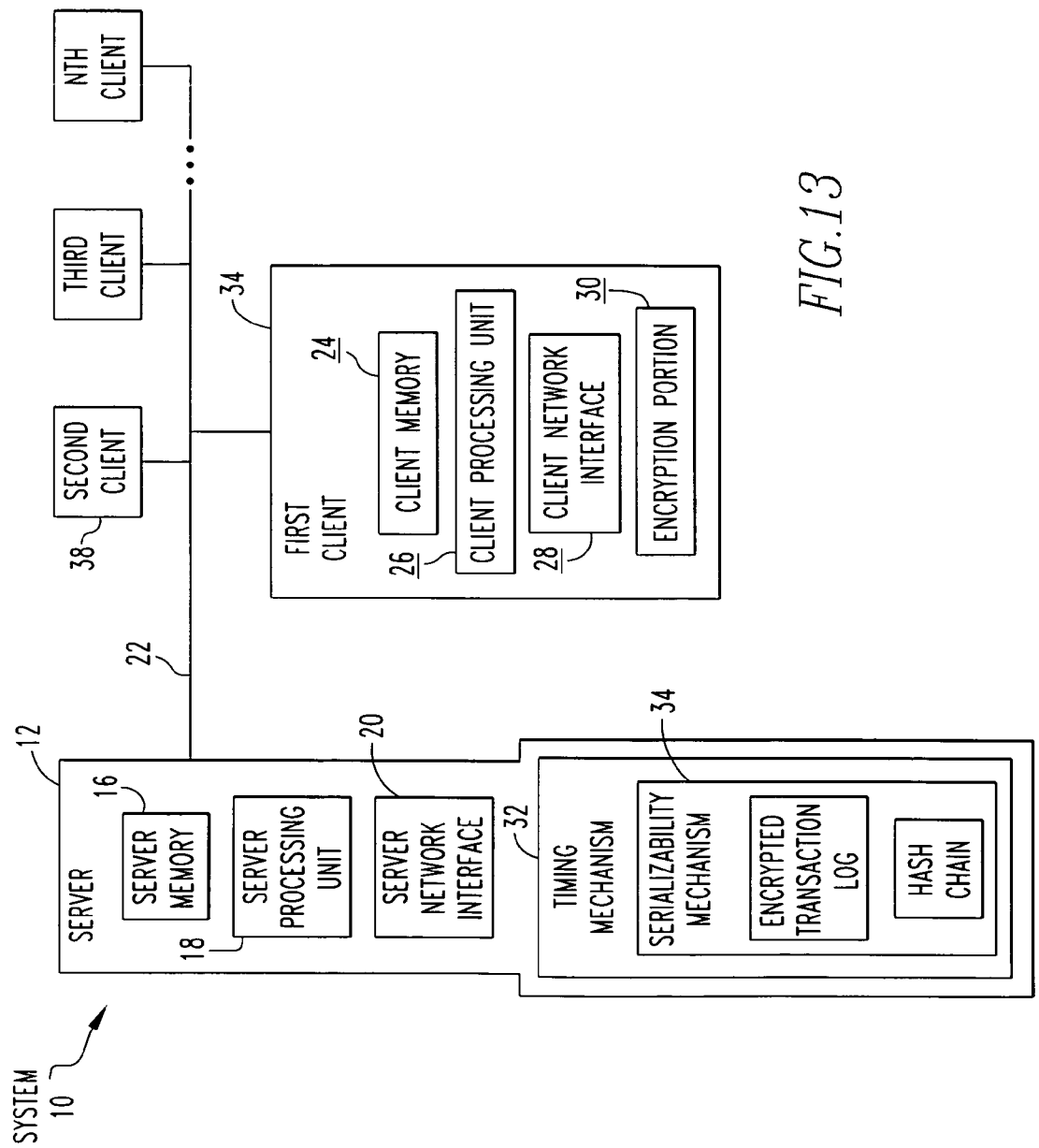
FIG. 13 is a block diagram of a system of the present invention.

Referring now to the drawings wherein like reference numerals refer to similar or identical parts throughout the several views, and more specifically to FIG. 13 thereof, there is shown a storage system 10. The system comprises a network 22. The system comprises a server 12 having a server memory 16, a server processor and a server network interface 20 in communication with the network 22. The system comprises a plurality of clients 14. Each client 14 has a client memory 24 in which data is stored, a client processing unit 26 and a client network interface 28 in communication with the server 12 through the network 22. Each of the clients 14 has an encryption portion 30 that enables each of the clients 14 to securely communicate and understand data with all other clients 14. The server memory 16 is shared by the clients 14 through the network 22 to store copies of encrypted data in the server memory 16 from the clients 14. The server 12 is unable to decrypt the encrypted data stored in the server memory 16. The server 12 has a timing mechanism 32 to ensure data that is shared is a desired copy.

Preferably, the timing mechanism 32 includes an encrypted transaction log of information about modifying transactions (i.e. transactions that change the database in any way). The clients 14 hold a copy of the database. They perform read-only transactions (transactions that do not modify the database) locally. The timing mechanism 32 preferably includes a serializability mechanism 34 which makes it appear as if each transaction occurs one at a time and in an order consistent with the encrypted transaction log. Preferably, the serializability mechanism 34 utilizes a hash chain. Thus, the desired copy is the copy that would result from a timing mechanism that includes a serializability mechanism. See FIGS. 1, 2 and 3 and the associated discussion below.

When the client processing unit 26 desires to perform a transaction entailing updates to data in the server memory 16, the client network interface 28 preferably sends an encoding of the transaction and the updates to the server 12. The server 12 then sends information about other transactions to the client 14 which the client processing unit 26 checks for a conflict between the transaction and the other transactions; with the client network interface 28 sending a commit message to the server 12 regarding the transaction if there are no conflicts. See FIG. 7.

The client processing unit 26 can detect conflicts by parsing and comparing SQL statements. The processing unit can append to the commit message a last value in the hash chain encoding all previous updates. The client processing unit 26 can verify that a value of a hash chain received from other clients 14 matches the other clients' own computation of the value of the clients' hash chain. The client processing unit 26 can recover data in the client memory 24 by obtaining and applying data from the server memory 16. The client network interface 28 can import a large object which the client processing unit 26 may modify, and the client network interface 28 sends the hash value of the modified object in updates to the server 12.

Figure 14:
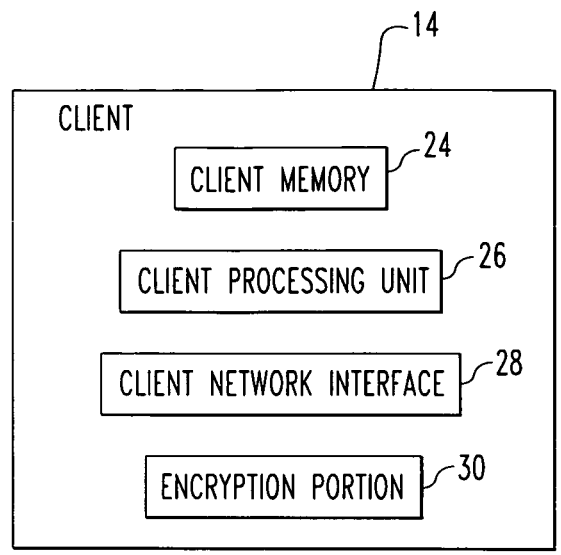
FIG. 14 is a block diagram of a client of the present invention.

The present invention pertains to a client 14 of a storage system 10, as shown in FIG. 14. The client 14 comprises a client memory 24 in which data is stored. The client 14 comprises an encryption portion 30 which encrypts and decrypts the data. The client 14 comprises a client processing unit 26 in communication with the memory which stores the data in the client memory 24 according to code the processing unit executes. The client 14 comprises a network interface in communication with the client memory 24 through which a request for a required slot in an encrypted transaction log, which is preferably permanent, of a server 12 is sent to the server 12 and through which an allocate transaction slot response from the server 12 is received.

Figure 15:
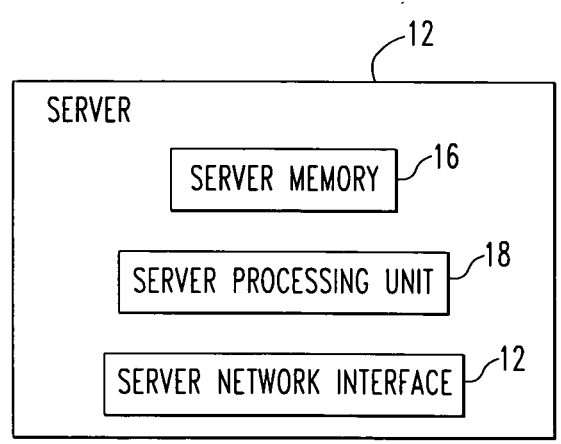
FIG. 15 is a block diagram of a server of the present invention.

The present invention pertains to a server 12 of a storage system 10, as shown in FIG. 15. The server 12 comprises a server memory 16 in which encrypted data from clients 14 is stored and shared. The server memory 16 having an encrypted transaction log, the server 12 is not able to decrypt the encrypted data. The server 12 comprises a server processing unit 18 in communication with the server memory 16. The server 12 comprises a server network interface 20 which receives a request for required slot in the transaction log from a client 14 through which an allocate transaction slot response is sent to the client 14.

The present invention pertains to a method for storing data. The method comprises the steps of sending an encrypted encoding of a transaction entailing updates to data, where a client processing unit 26 of a client 14 desires to perform those updates from a client network interface 28 of the client 14 through a network 22 to a server 12. The server 12 is unable to decrypt the encoding. There is the step of sending information about other transactions to the client 14 from a server network interface 20 of the server 12 through the network 22. There is the step of checking with the client processing unit 26 for a conflict between the transaction and the other transactions 705. There is the step of sending 706 a commit message from the client network interface 28 to the server 12 regarding the transaction if there are no conflicts. There is the step of executing the transaction on each client 14.

Preferably, there are the steps of sharing a server memory 16 of the server 12 by other clients 14 through the network 22 to store copies of encrypted data in the server memory 16 from the clients 14. The server 12 is unable to decrypt the encrypted data stored in the server memory 16 there is the step of ensuring data that is shared is a desired copy with a timing mechanism 32 of the server 12. The ensuring step preferably includes the steps of sending a request from the client network interface 28 through the network 22 to the server 12 for a required slot in an encrypted transaction log of the server 12; and receiving at the client network interface 28 an allocate transaction slot response from the server 12.

Preferably, the ensuring step includes the step of causing the transactions to have the effect of occurring in an order consistent with the order of the log. In the case that the database is a relational database, the checking step preferably includes the step of detecting with the client processing unit 26 conflicts by parsing and comparing SQL statements. There can be the step of the client processing unit 26 appending to the commit message a last value in a hash chain encoding all previous updates. There can be the step of the client processing unit 26 verifying that a value of a hash chain received from other clients 14 matches the other clients' own computation of the value of the clients' hash chain. See FIGS. 9 and 10 and the associated discussion below.

There can be the step of the processing unit recovering data in the client memory 24 by obtaining and reading and decrypting data from the server memory 16. There can be the steps of the client network interface 28 importing a large object, if the client processing unit 26 modifies the object, then the client network interface 28 preferably sends the hash value of the modified object in updates to the server 12. The server 12 preferably cannot determine whether more than one client 14 is accessing data which is the same or a single client 14 accesses data which is the same at different times. There can be the step of the clients 14 sending timestamps of a last update to ensure the server 12 has not been withholding updates.

The present invention pertains to a method of a client 14 of a storage system 10. The method comprises the steps of storing data in a client memory 24 according to code a client processing unit 26 executes. There is the step of encrypting a request for a required slot in an encrypted transaction log of a server 12 with an encryption portion 30. There is the step of sending the encrypted request to the server 12 through a client network interface 28. There is the step of receiving an allocate transaction slot response from the server 12.

The present invention pertains to a method of a server 12 of a storage system 10. The method comprises the steps of storing encrypted data from clients 14 in a server memory 16 which a server processing unit 18 cannot decrypt, the server memory 16 having an encrypted transaction log. There is the step of receiving at a server network interface 20 a request for a required slot in the transaction log from a client 14. There is the step of sending an allocate transaction slot response to the client 14 through the server network interface 20.

The present invention pertains to a storage system 10. The system comprises a network 22. The system comprises a server 12 having a server network interface 20 in communication with the network 22, a server processing unit 18 and a server memory 16 for storing data. The system comprises a first client 36 and at least a second client 38. Each client having a client processing unit 26, a client memory 24, encryption portion 30 and a client network interface 28 in communication with the network 22. When the first client 36 desires to perform a deterministic transaction T1 (a deterministic transaction is one whose operations depend only on the program code and on the values read from the database; a non-deterministic transaction may depend on timing, time-of-day, random numbers, data from a physical measurement, or other data that is not determined by values read from the database) to the server 12 and desires to perform a non-deterministic transaction T2 having core modifications M2 to the server database, the first client 36 sends from its client network interface 28 to the server 12 an encrypted executable description of T1, as encrypted by the encryption portion 30 of the first client 36, and an encrypted executable description of M2 as encrypted by the encryption portion 30 of the first client 36. The server network interface 20 sends information about an ordered sequence of transactions X including both deterministic and non-deterministic transactions to the second client 38. The client processing unit 26 of the second client 38 executes transactions X in the order they were sent to the server 12 from at least the first client 36.

Preferably, the processing unit of the first client 36 appends to a commit message a last value in a hash chain encoding all previous updates. The client processing unit 26 of the first client 36 verifies that a value of a hash chain received from other clients 14 matches the other clients' own computation of the value of the clients' hash chain. Preferably, client processing unit 26 recovers data in the client memory 24 by obtaining and applying data from the server memory 16. The client network interface 28 of the first and second clients 36, 38 sends timestamps of a last update to ensure the server 12 has not been withholding updates.

The present invention pertains to a computer readable medium storing a computer program which when executed by at least one client processing unit of a client of a storage system communicates with a server. The computer program comprises instructions for the client processing unit generated steps of storing data in a client memory. There is the step of encrypting a request for a required slot in an encrypted transaction log of the server. There is the step of sending the encrypted request to the server through a client network interface.

The present invention pertains to a computer readable medium storing a computer program which when executed by at least one server processing unit of a server of a storage system communicates with a client. The computer program comprises instructions for the server processing unit generated steps of storing encrypted data from clients in a server memory which the server processing unit cannot decrypt. The server memory having an encrypted transaction log. There is the step of receiving at a server network interface a request for a required slot in the transaction log from the client. There is the step of sending an allocate transaction slot response to the client through the server network interface.

Databases are virtually ubiquitous in large enterprises. The reason is simple to understand. Enterprises have information and they need to look up that information and change it. That's what databases do. As the importance of databases increases, so does the need for high availability and reliability. It's fair to say that many enterprises would simply go out of business if they lost their data or even if it became unavailable for an extended period of time. For this reason, large enterprises devote substantial resources to high quality back-ups—redundant machines in different locations using independent power, managed by specially trained personnel. Small or medium sized enterprises might choose to avoid this expense in equipment, real estate, and personnel. They might like to store their data using an outsourcing service provider (hereafter Provider) that has all these facilities. As an added benefit, they might use a distributed Provider so each client computer's database system can be extremely simple (e.g. a free database management system) and the Provider takes care of world wide distribution.

Unfortunately, enterprises that are worried about their data might also be worried about someone viewing or inferring their data. This is not an idle fear. Secrets can be worth billions (for example, merger and acquisition data). In some countries, a provider employer is not even allowed to ask whether a prospective employee has been convicted of data theft. Contractual protections for outsourcing providers are mostly of the "best effort" kind, i.e. no protection at all.

So, what a customer would want is for the Provider to take care of data durability and data distribution. Clients should enjoy a distributed database system with full transactional guarantees and full functionality (all of SQL or homegrown commands). The Provider should learn nothing.

On first hearing this, one may think that it is enough to encrypt the data on the Provider. But this is insufficient for several reasons. For one thing, "traffic analysis" is possible. For example, if client c1 accesses data x and then buys IBM and later client c2 accesses data x, then maybe IBM will be involved. The Provider, without decrypting the data, can determine what the data might concern based on its access pattern. (Traffic analysis is a well known technique in history. For example, financial speculators used to look at the size of Federal Reserve chairman Alan Greenspan's briefcase to determine whether he was going to announce a change to interest rates.) In addition, the Provider if it is in charge of the distributed communication among the clients may "fork" or "partition" the clients by presenting each different client with a separate history of the transactions hitting the database, effectively giving different clients different views of their data worlds.

So, clients would want access privacy (the Provider should not be able to determine which data a client accesses), single-copy serializable transaction semantics for distributed transactions, and good performance. Single-copy serializable transaction semantics means that the parallel/concurrent execution of transactions should have the same effect as a serial execution of transactions on a single copy of each data item.

The Provider can be assumed to be curious (wants to know the clients' data and is willing to do traffic analysis) and might try a forking attack (less likely but possible), but does not want to be discovered in the act. That is, the Provider is concerned to maintain a good reputation.

Given the goals and assumptions described above, the system and methods used by this invention is now described. The system consists of two or more clients (clients here mean client machines all belonging to trusted individuals, say employees in a company), each holding a complete copy of the database but on unreliable hardware. The Provider (server) holds a log of all modifying transactions (e.g., in SQL, transactions that perform insert, delete, or update). Because the Provider is untrusted, the log is encrypted using an encryption key that the Provider does not possess. In addition, the Provider holds a "hash chain" which encodes the history embodied by the log.

A new or recovering client can read and decrypt the transaction log to create the database. Because the log can grow in size, an optimized approach is to have clients store encrypted "snapshots" of the database. For example, the k-snapshot of the database would be a copy of the database after the kth transaction in the log. Given the snapshot, a new or recovering client can download a k-snapshot and then read the log following transaction k.

In all protocols, each client performs all read-only transactions on its local copy of the database. Information about each modifying transaction is sent to the Provider (if the Provider is distributed, then any location where the Provider can receive messages). The protocols ensure that all clients perform all transactions in the same order. The Provider ensures the durability of the log. Because all transactional information sent to the Provider is encrypted and appended to a log, the Provider does not learn which data is accessed (access privacy).

In the simplest protocol (called the strawman), when a client c wants to do a modifying transaction t, it sends a request to the Provider for a location on the transaction log. When the Provider responds with a location j used for no other transaction, then c waits until all transactions having lesser locations complete and then executes its own transaction locally and then sends its updates to the Provider for further redistribution. The main problem with this protocol is that if c stops between the time it requests its slot and the time it performs t, no transaction following t's slot can proceed. So, the protocol is very sensitive to failure.

In the preferred embodiment (second protocol), client c, having seen all transactions up to say k, performs modifying transaction t locally on the state reflecting the first k committed transactions, but c does not commit t. Client c records the updates U that t would have done (in some alternatives U includes the items read by t). Client c encrypts U and sends the encrypted result to Provider along with an indication that c knows the database state up to transaction k. That is the "pre-commit" of transaction t. The Provider sends to c all transactions X that have committed or pre-committed since transaction k. If any of the transactions X conflict with t then c sends an "abort t" message to the Provider else c sends a "commit t" message to the Provider. Two transactions t1 and t2 conflict if ordering them in one way (say t1 before t2) vs. another (say t2 before t1) results in a different state of the database or causes either t1 or t2 to read different values from the database. It is still possible that a client might pre-commit a transaction but never subsequently send a commit or abort message. In that case, provided U contains the set of items that transaction t has read, another client (different from c) may determine and record the abort/commit status of transaction t.

(A slight variation of this protocol is to allow a client c to perform and commit t before sending its updates to the Provider. If transaction t ends by aborting, then it must abort locally. This approach is called "optimistic" because it assumes that aborts are rare.)

One disadvantage of the second protocol is that transactions may abort. This opens up the possibility of "livelock" in which a transaction never succeeds because it is continually aborted. The third protocol is a lock-free, wait-free, abort-free protocol (hereafter called the triple-free protocol): each client c, when it receives a transaction to execute, sends the transaction text (the instructions making up the transaction including the control flow (e.g., if and while statements)). The Provider simply sends all transaction texts to all clients in the same order. Provided all clients begin a transaction in the same state and the transaction is "deterministic" (meaning its behavior depends only on its input arguments and on the database state), the clients will all execute the transaction and end in the same state. For transactions that violate this notion of determinism, clients behave as in the preferred embodiment.

The Provider may try to mount a partition/forking attack. Suppose that client c1 performs transactions t1 and c2 performs t2. The Provider may show t1 but not t2 to some clients and t1 but not t2 to others and t1 and t2 to yet others. The hash chain will ensure this doesn't happen in two stages. First the hash chain will ensure "fork consistency". That means that if the Provider sends c1 a transaction t1 and then t2 to c1 but sends t2 to c2 without sending t1 first, then the two clients will encode history differently. Second, if c1 and c2 ever exchange their encodings of history, they will see that they differ. This will show that the Provider has performed a forking attack.

In summary, a client company can store data and perform transactions with a Provider with full access privacy and with full serializability. If the Provider forks clients or denies service, it will be found out. Finally, the invention allows arbitrary operations on the database.

The following details of the participants in this protocol are provided, the required transaction semantics, and the cryptographic primitives employed.

Parties

Provider/Server. The provider owns durable storage, and commonly would like to provide use of this storage for a fee.

The provider, being hosted in a well-managed data center, also has high availability. Since the provider has different motivations than the clients 14, it is assumed that it is a possibly malicious provider. However, the provider is assumed to want to avoid being detected in its malicious behavior, so will not deny service if that denial can be detected or behave in another way that is likely to be detected.

Clients 14. In our model, the clients 14 are a set of trusted parties who must run transactions on a shared database with full ACID (atomicity, consistency, isolation, and durability) guarantees. Since storage is cheap, each client 14 has a local hard disk or other form of storage to use as working space; however, due to the fragile nature of hard disks or other storage, it is not assumed this storage is permanent. Additionally, the clients 14 would like to perform read queries as efficiently as possible without wasting network bandwidth or paying network latency costs. Each of the trusted parties would also like to be able to continue running transactions even when the others are offline, possibly making use of the provider's high availability.

The clients 14 would like to take advantage of the durability of the provider's storage, but they do not trust the provider with the privacy or integrity of their data. Specifically, the provider should observe none of the distributed database contents. A notion of consistency is defined between the clients' database views to address integrity. It is not necessary that all clients 14 see exactly the same data as the other clients 14 at exactly the same time; however, they need to agree on the sequence of updates applied. Trace c,i is defined to be the series of the first i transactions applied by client c to its local database copy. Clients c and d are considered i-trace consistent if trace c,i=trace d,i.

Figure 9:
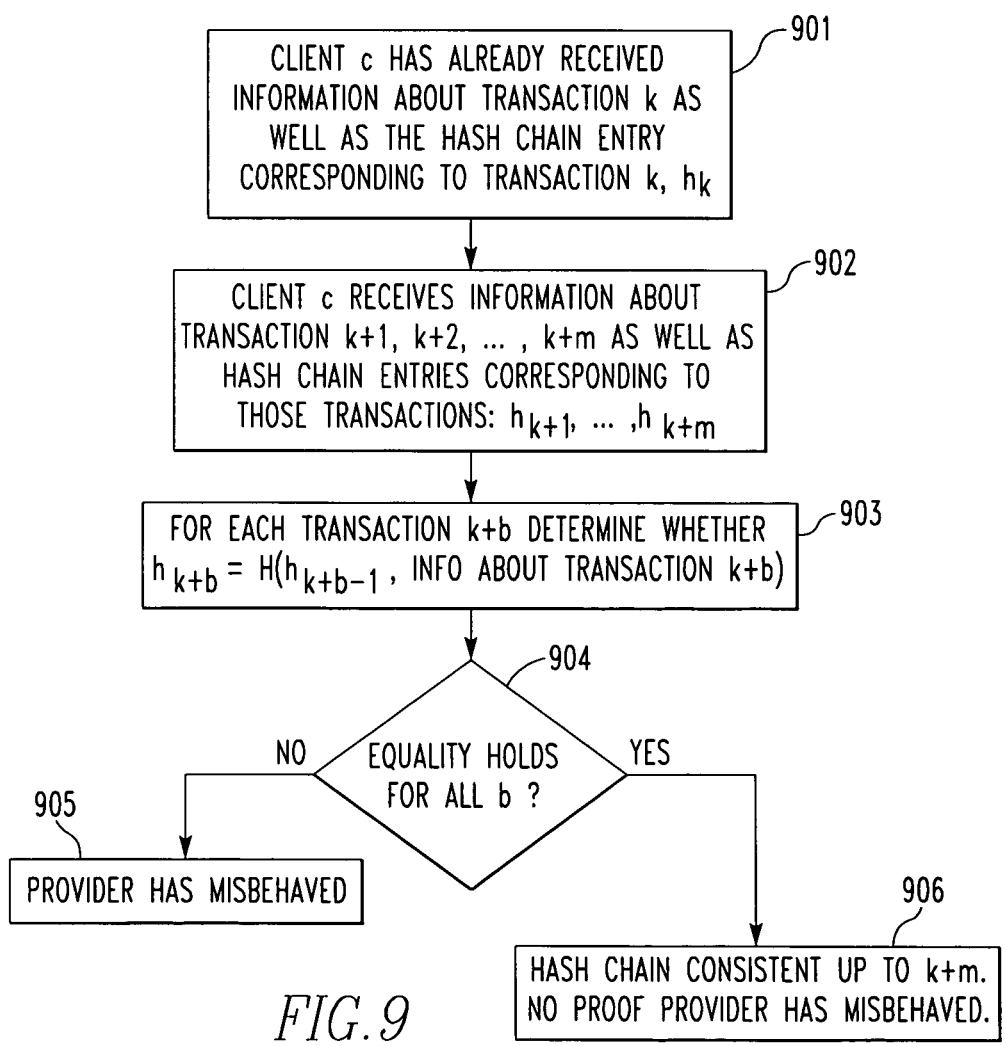
FIG. 9 shows how a client verifies that a hash chain is consistent with the transaction the client has received.
Figure 10:
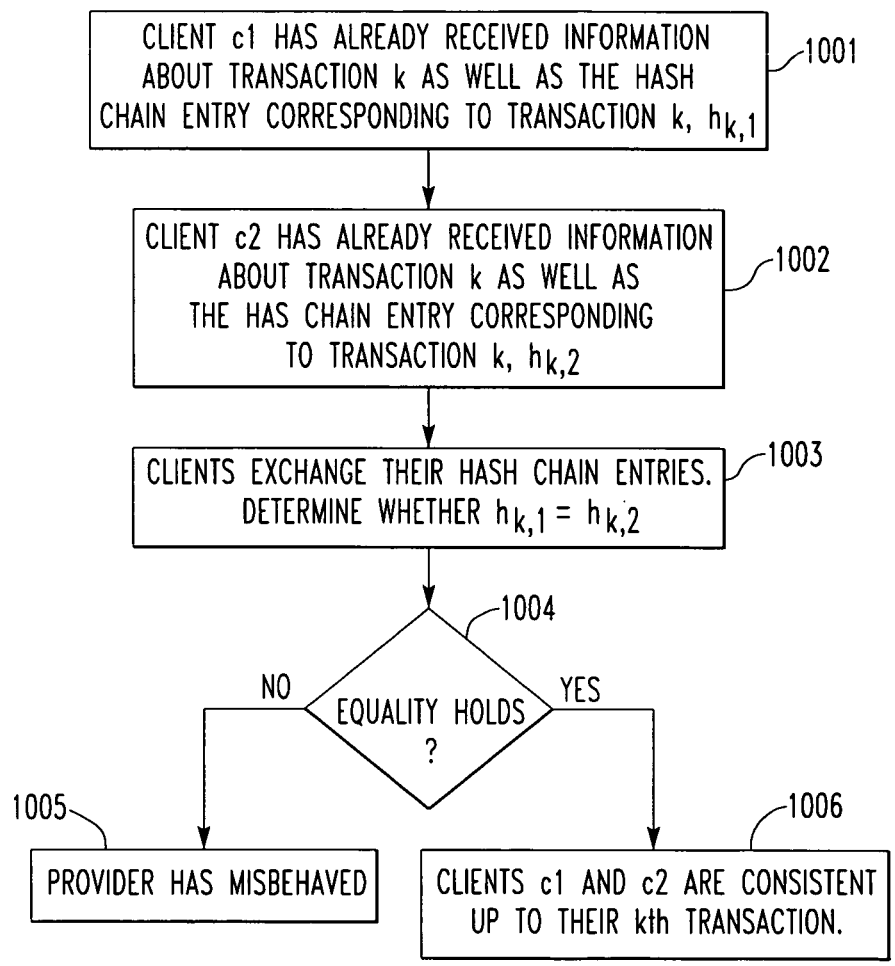
FIG. 10 shows how to clients verify that they have received a consistent history up to transaction k.

In some scenarios, the provider might be able to partition the set of clients 14, and maintain separate versions of the database for each partition. This partitioning attack (also known as a forking attack) has been examined in previous literature; if there are non-inter-communicating asynchronous clients 14, the best that can be guaranteed is fork consistency [52]. Any adopted solution should guarantee that the data repository is fork consistent; that is, all clients 14 within a partition agree on the repository history (FIG. 9). This is not as weak of a guarantee as it may appear to be on the surface, because once the provider has created a partition, the provider must block all future communication between partitioned clients 14, or else the partition will be immediately detected as shown in FIG. 10.

Clients 14 are assumed not to leak information through transaction timing and transaction size. Clients 14 in real life may vary from this with only minimal loss of privacy, but a timing and size side-channel free model is used for illustration purposes. It is also possible for a client concerned with timing and transaction size leaks to send null transactions of various sizes at irregular intervals.

The first part of this invention assumes a potentially malicious provider, but trusted clients 14. In Section 7.1, this assumption is relaxed to provide protection against not only a potentially malicious provider, but against malicious clients 14 as well.

Transaction Semantics

Transactions can be simple key-value pair updates, as in a block file system, or they can be full SQL transactions among many other possibilities. Clients 14 may buffer many local updates over a long period of time, e.g. when the client 14 is disconnected, and then sends them as a single transaction. The only requirements for using this protocol is that the underlying transaction-generating system that provides the following interface:

RunAndCommitLocalTransaction(Transaction T) applies transaction t to the local database and commits it.

DetectConflict(TransactionHandle h, Transaction C) returns true if any database reads of Transaction Th would change if transaction C had been issued before Th. This is sufficient in the case in which transactional updates are executed serially (one updating transaction at a time) on each client 14 site. Read-only transactions may execute concurrently.

In an alternate embodiment in which non-conflicting transactions may execute concurrently, then this DetectConflict function returns true in another case as well: if the database state resulting from Th before C would differ from that resulting from C followed by Th.

Retry(TransactionHandle h) rolls back all changes (in the local database, and any side-effects external to the database) for uncommitteed transaction Th and reattempts the transaction.

RollbackLocal(TransactionHandle h) rolls back local database changes from uncommitteed transaction Th, but may preserve the database updates (i.e. modifications of any kind including inserts and deletes) and the set of data items read.

The following interface is provided to the transaction-running system:

DistributeTransaction(Transaction T, TransactionHandle h) returns once transaction T has been successfully committed to the global database image. Implementations of this command will invoke the callbacks above.

Cryptographic Primitives

Several cryptographic primitives are required with all the associated semantic security [37] properties: (i) a secure, collision-free hash function which builds a distribution from its input that is indistinguishable from a uniform random distribution (the notation $H(x)$) is used as described for example in Bakhtiari, S.; Safavi-Naini, R.; and Pieprzyk, J. *Cryptographic Hash Functions: A Survey*. Technical Report 95-09, Department of Computer Science, University of Wollongong, July 1995, (ii) an encryption function that generates unique ciphertexts over multiple encryptions of the same item, such that a computationally bounded adversary has no non-negligible advantage at determining whether a pair of encrypted items of the same length represent the same or unique items (one way to construct such a function is by using a standard private key encryption function E, but then on each application of E to some message m, append to m a large randomly chosen number used only once (sometimes called a nonce)), (iii) a pseudo random number generator whose output is indistinguishable from a uniform random distribution over the output space, and (iv) a recursive hash chain construction used to incrementally build a secure hash value over a sequence of items, illustrated in FIG. 5.

Figure 1:
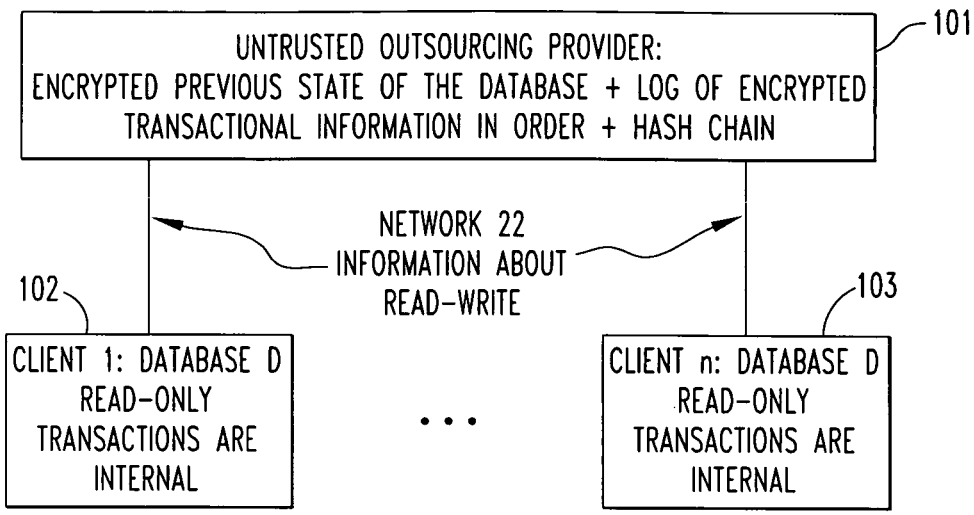
FIG. 1 shows the configuration of the preferred embodiment consisting of at least two clients and an untrusted outsourcing provider.

In regard to FIG. 1, box 101 is the untrusted outsourcing provider. It holds the following in an encrypted form (using a form of encryption that the clients can transform to cleartext but which the provider cannot): zero or more previous states of the database, a log of information about modifying transactions (i.e. transactions that change the database in any way), and a hash chain. The clients 102 and 103 hold a copy of the database. They perform read-only transactions (transactions that do not modify the database) locally. They send information about modifying transactions in encrypted form to the provider.

Figure 2:
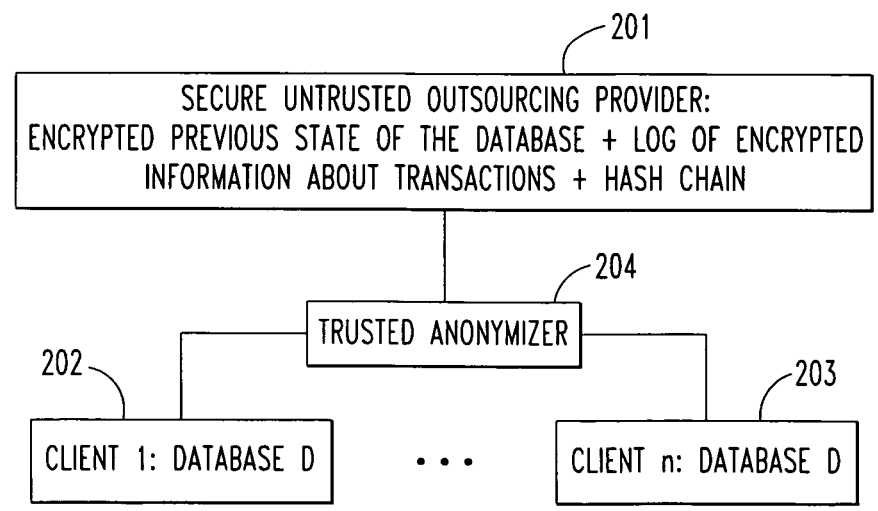
FIG. 2 shows a similar configuration except that intermediate between the clients and the outsourcing service provider there is an anonymizing service that prevents the server from knowing the identity of the client with which it is communicating.

In regard to FIG. 2, box 201 is the untrusted outsourcing provider (like box 101). Boxes 202 and 203 correspond to 102 and 103. Box 204 is used to hide from the outsourcing provider the identity of the client sending a message.

Figure 3:
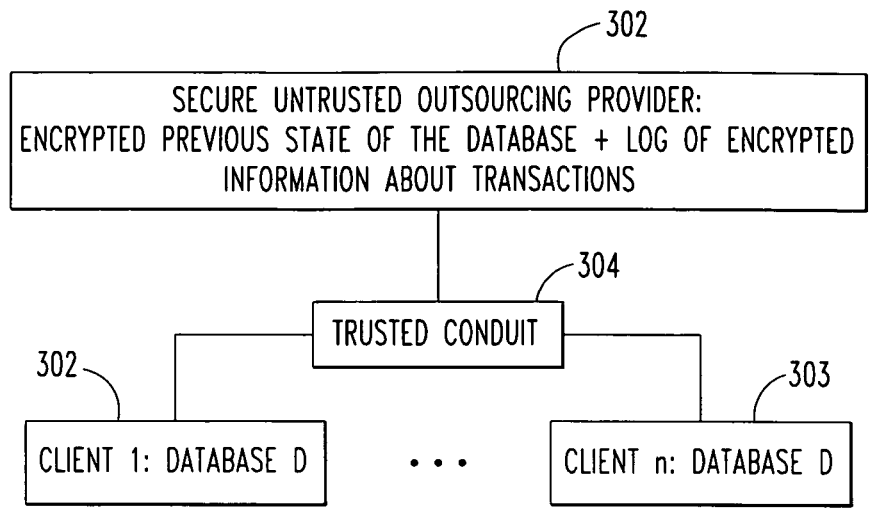
FIG. 3 shows at least two clients, an untrusted outsourcing provider and a trusted intermediary among clients to manage transaction serializability

In regard to FIG. 3, box 301 is the untrusted outsourcing provider but does not hold a hash chain. Boxes 302 and 303 are like 102 and 103 but they never append to a hash chain. Box 304 ensures serializability and is trusted by the clients. Box 304 encrypts data and sends it to the outsourcing provider.

Figure 4:
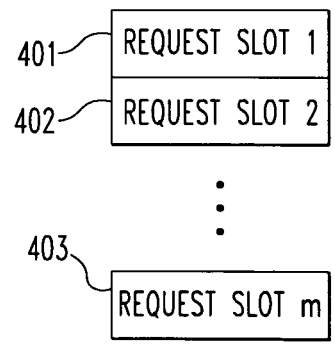
FIG. 4 illustrates the encrypted transaction log on the server.

In regard to FIG. 4, boxes 401 . . . 403 are locations in the encrypted transaction log. Each will contain information about a transaction.

Figure 5:
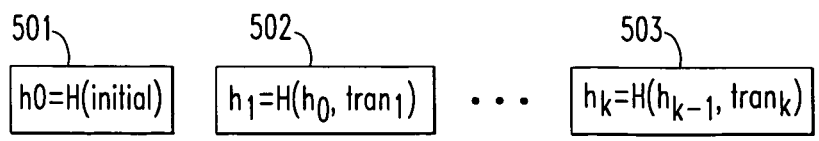
FIG. 5 illustrates the hash chain on the server.

In regard to FIG. 5, 501 . . . 503 are entries in the hash chain. Entry $h_k$ corresponds to the application of the hash function H on the result of the previous hash as well as information about transaction k.

Figure 6:
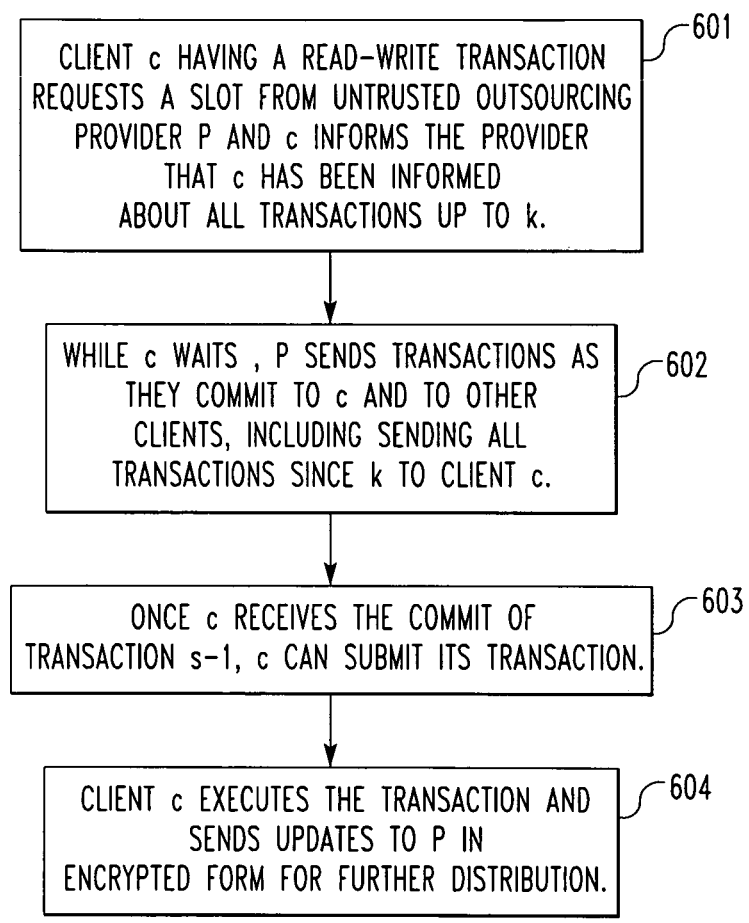
FIG. 6 shows the strawman method, a method to show the fundamental ideas.

In regard to FIG. 6, the strawman algorithm. In this algorithm, the client waits its turn until it can send information about its transaction. The turn is indicated by the slot given to the client by the provider.

Figure 7:
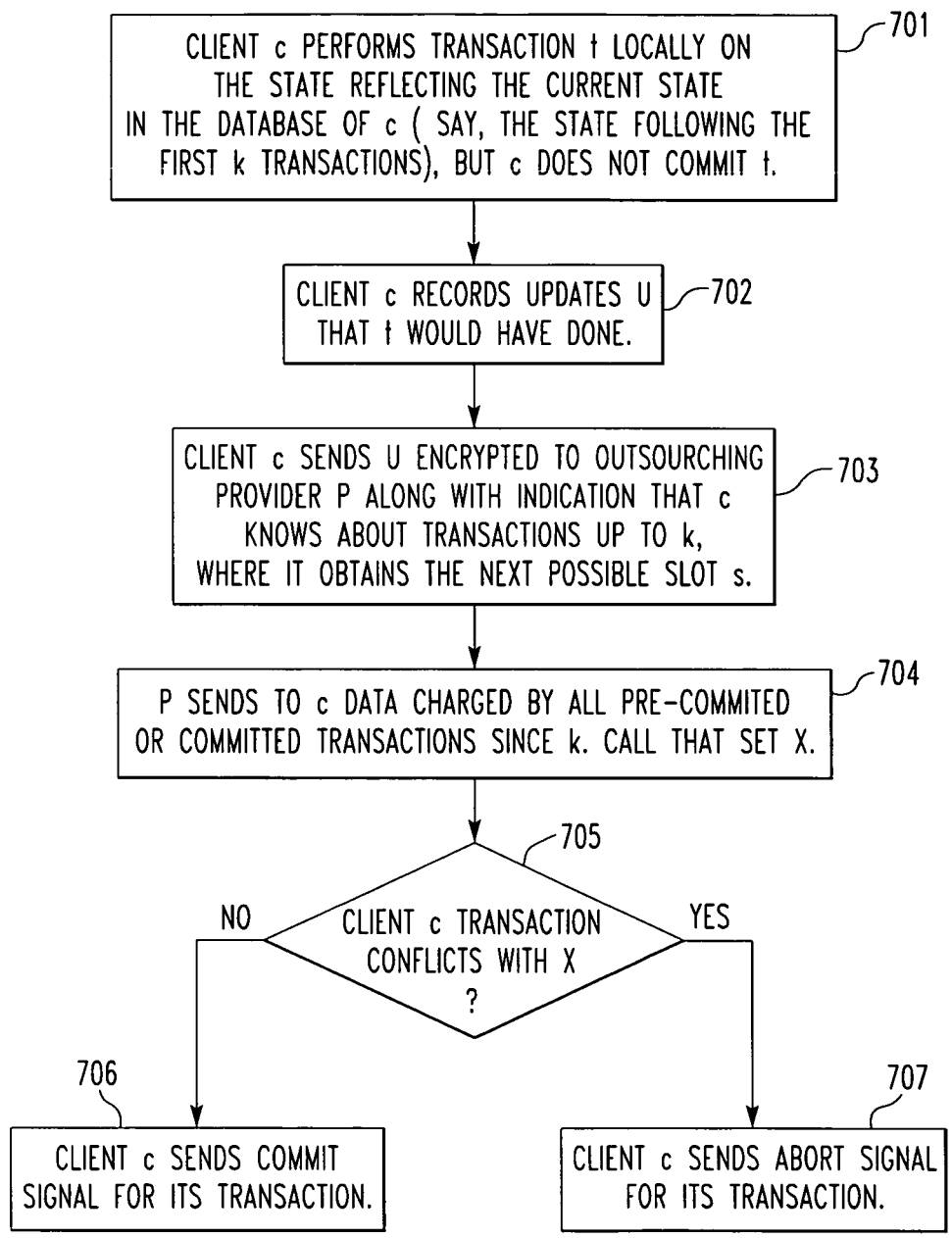
FIG. 7 shows the method of the preferred embodiment.

In regard to FIG. 7, there is shown a preferred embodiment. In 701, client c performs a transaction t on the current state of the database in c. In 702, c records any changes U to the database. In 703, c encrypts U and sends the encrypted result to the outsourcing provider P along with an indication that c reflects the state of the first k transactions. In 704, the provider P sends back a description of the updates X of all pre-committed or committed transactions since transaction k. If the new transaction t conflicts with X, then c aborts the new transaction t. Otherwise, c commits the transaction t. All clients perform the updates associated with committed transactions in order of the slot numbers of those transactions against their local databases.

One alternative embodiment of this algorithm is that the client includes in box 702 the elements that transaction t reads as well as those that it changes in U. In that case, other clients could determine whether t should commit or abort based on whether the changes X of 704 conflict with this new set U. So, if c stops making progress, another client will be able to do this work for c.

Figure 8:
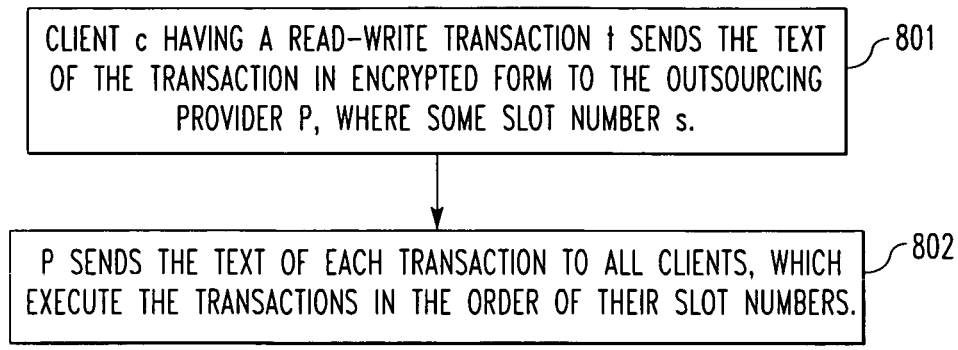
FIG. 8 show the method of an alternate embodiment, the triple-free protocol.

In regard to FIG. 8, there is shown a wait-free, abort-free, lock-free (triple-free) variant of the preferred invention. In 801, the client encrypts and sends the text of a transaction and obtains a slot number s. In 802, the provider sends this text to all clients. The clients execute the texts in the order of slot numbers.

In regard to FIG. 9, the hash chain is used to mark the order of read-write transactions. In 901 assume the client c has established the consistency between transaction k and $h_k$, the kth element in the hash chain. In 902, the client receives information (either transaction updates in the case of the preferred embodiment or transaction text in the case of the alternate triple-free method). In 903, the client determines whether the hash chain is consistent with the information about the transaction using the shared (among clients) hash function H. In box 904, the test is whether each element k+b in the hash chain is consistent with the result of the hashing calculation for the corresponding transaction k+b. If this holds for all values b between 1 and m inclusive, then (box 906) the hash chain for this client is consistent up to transaction k+m. Otherwise, (box 905) the provider has misbehaved.

In regard to FIG. 10, even if each client sees a consistent hash chain, the server may have "forked" two clients and given them different hash chains. At some point each of clients c1 and c2 counts up to some number k transactions. They are not sure whether they have seen the same k transactions. So in box 1001, c1 computes its kth hash chain entry $h_{k,1}$. Similarly, in box 1002, c2 computes its kth entry in $h_{k,2}$. The two clients exchange their values in 1003. If equal (test in box 1004), then (box 1005) clients c1 and c2 are consistent up to their kth transactions. Otherwise (box 1005), they are not.

Figure 11:
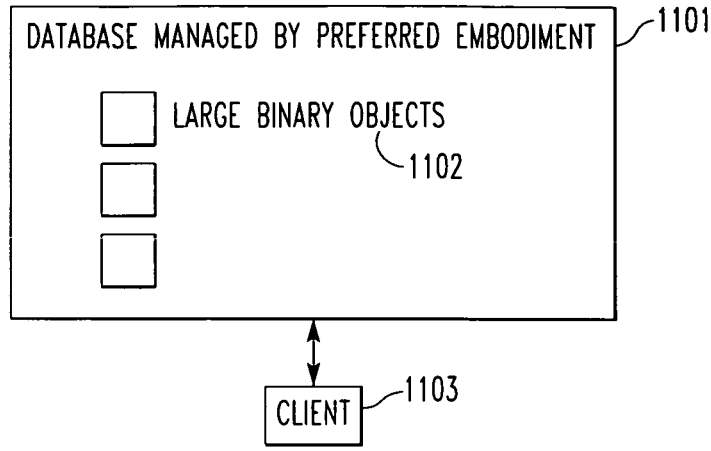
FIG. 11 illustrates the preferred embodiment without the large object reference extension.

FIG. 11 illustrates the preferred embodiment without the large object reference extension; large binary objects (1102 in FIG. 11) are stored in the database (1101 in FIG. 11) as with any other type of data. In accordance to the preferred embodiment, they are broadcasted among clients (1103 in FIG. 11) on each update, and a copy of each is stored by each client. This can be used with any of the embodiments (strawman, preferred, triple-free, and their variants.)

Figure 12:
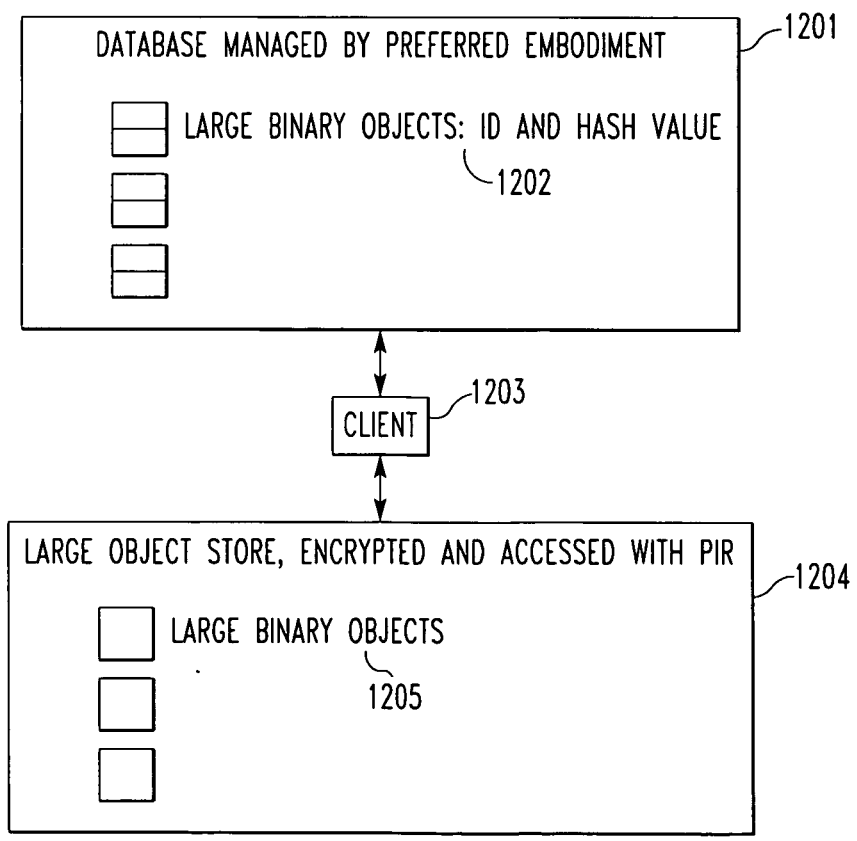
FIG. 12 illustrates the preferred embodiment with the large object reference extension.

FIG. 12 illustrates the preferred embodiment with the large object reference extension. Large binary objects (1205 in FIG. 12) are stored in a separate large object store (1204 in FIG. 12), with only their IDs and content hash values (1202 in FIG. 12) stored in the main database (1201 in FIG. 12). The large object store is maintained by the server 12; clients 14 (1203 in FIG. 12) use a PIR algorithm with writes (such as in reference [74]) to add and delete objects in the large object store, using their object ID. During transaction processing, whenever a client 14 needs to access the content of a large object, the client downloads the object (1205 in figure) from the large object store (1204 in FIG. 12) using PIR. The client 14 verifies that the hash value stored in the main database (1201 in FIG. 12) matches the hash value of the downloaded object. If there is a mismatch, this indicates server misbehavior. To insert a new large object into the database, the client 14 chooses a new 128-bit random object ID, inserts the object into the large object store, and records the object ID and hash value in the main database. To modify a large object, the client adds the object as a new object with a new ID to the large object store, replacing the old object ID and hash value with the new object ID and hash value in the main database. This can be used with any of the embodiments (strawman, preferred, triple-free, and their variants.)

This invention presents several embodiments. The preferred one assumes a potentially malicious provider 101, but trusted clients 14 [102 and 103]. All transactions are encrypted by a symmetric key shared by the set of clients 14, and kept secret from the provider. Message authentication prevents tampering, and the use of a versioning structure guarantees database cache consistency. A strawman protocol (FIG. 6) begins to reveal the solution by providing the security guarantees trivially using a global lock (Section 4). The preferred embodiment (FIG. 7) is a protocol providing these guarantees using an optimistic wait-free protocol (Section 5). An alternative environment that allows no aborts for deterministic transactions is presented next (FIG. 8). Several extensions to this protocol are described, including in Section 7.1 protection against not only a potentially malicious provider, but against malicious clients 14 as well. Finally, our implementation shows how the preferred embodiment can be layered on top of existing SQL-based relation database management systems while obtaining practical performance overheads.

Strawman: Outsourced serialization+durability with a global lock

Starting by illustrating the main concepts through a strawman protocol allows multiple clients 14 to serialize their transactions through an untrusted provider—transaction atomicity being guaranteed through a single global lock. Naturally, in practice, global locking is not a viable option as it would constitute a significant bottleneck. The preferred embodiment, described in Section 5, is optimistic and lock-free.

An encrypted transaction log shown in FIG. 4 is the central data structure in all versions of this model. This log is the definitive representation of the database; the protocols described here simply allow clients 14 to append to this log in a safe, parallel manner while preventing the potentially malicious provider from interfering with operations on the log or from understanding the contents in the log. Whereas the log is the definitive representation of the database, an alternative embodiment is to store a full encrypted copy of the database from time to time reflecting the state of the log up to some modifying transaction k. A recovering client that reads that copy of the database may read the log starting at modifying transaction k+1. (It should be noted that modifying transactions, updating transactions, and modifying transactions mean the same thing.)

At an overview level, in this strawman protocol, clients 14 maintain their own copy of the database in local temporary storage. Each performs operations on this copy and keeps it synchronized with other clients 14. Clients 14 that go offline and come back online later, obtain a client-signed replay log from the untrusted provider in charge of maintaining the log.

Transaction Protocol DistributeTransaction Procedure

Informally, to run a transaction, a client 14 (a) "reserves" a slot in the transaction log, (b) waits for the log to "solidify" up to its assigned slot, (c) runs the transaction, (d) "commits" that slot by sending out a description of the transaction to the untrusted provider. Specifically:

(a) The client 14 issues a "request slot" slot reservation command 601 to provider, along with a number k representing the last slot the client 14 knows about (has seen updates for). The provider assigns the next available transaction slot s to the client 14. The provider sends back to the client 14 this slot number s, with a list of all commits since the last update $C_k$ received by the client, $C_{k+1} \ldots C_j$. Note that j<s−1 if there are clients 14 reserving slots that have not yet committed at the instant the provider issues this response.

(b) The client 14 blocks until all transactions in slots before its assigned slot have committed (i.e., until it has received $C_{s-1}$). The client 14 continues to receive all $C_{j+1} \ldots C_{s-1}$, updates from the provider as they come in. The client 14 verifies certain checksums and authentication tokens (hash chain and signatures, see below) on each commit, then applies it also to its local database copy (using RunAndCommitLocalTransaction) in sequential order.

(c) Once the client 14 has received $C_{s-1}$, it has in effect obtained a global lock (box 603), since all other clients 14 are now waiting for it to perform a transaction. The client 14 now runs its own transaction on the local copy of the database and (d) commits (relinquishing the lock) by sending a complete encrypted description of the transaction updates CS back to the provider (which will relay it back to the other clients 14).

A client-encrypted description of a transaction update Ci contains the following information, encrypted and signed with a symmetric key K shared by all clients 14: desc=a transaction description, e.g., a sequence of SQL statements. In addition, there is a hashchain not contained in the description of the transaction, where the hashchain consist of a number of entries $HC_1, \ldots HC_{i-1}$ Element $HC_{i-1}$ verifies the sequence of transactions $C_1 \ldots C_{i-1}$. Note that $HC_i$ is calculated as $H(HC_{i-1} \| C_i)$, and HC0=H(initial). Here the value "initial" is some value known to all clients. H is a secure collision-free hash function. Also, the symbol $\|$ means concatenation (i.e. x$\|$y means x followed by y). Also, the hash chain element for $HC_i$ may also include the transaction number i.

A client c applies transaction Ci (using RunAndCommitLocalTransaction) to its database once all the following conditions hold: (i) the contents of Ci have a valid signature from a valid client 14 (using client-shared symmetric key K), (ii) the client has applied transactions C1 . . . Ci−1, and (iii) the hash chain link corresponding to Ci−1.hashchain matches the client's own computation of link HCi−1.

The obvious disadvantage to the above protocol is that it requires a global lock, restricting transaction processing as only one client 14 may be active at a time. In the following protocol, all locking is removed and replaced with an optimistic conflict-detection mechanism. This allows clients 14 to run transactions concurrently, but adds the requirement that transactions are rolled back in case of conflicts.

At an overview level, this protocol works as follows (FIG. 7). A client 14, denoted c, first issues an (encrypted) notification of its pending transaction t, relayed to the other clients 14 through the untrusted provider. This contains enough information to allow other clients 14 to determine whether said pending transaction t will cause a conflict with their own pending transactions. After this notification ("pre-commit"), client c then checks to see if t conflicts with any transactions scheduled to run before t. If not, c issues the commit; otherwise c may retry with a new request. As in the previous protocol, clients 14 maintain a transaction hash chain to guarantee consistency for misbehaving providers.

One alternative embodiment of this algorithm is that the client includes in box 702 the elements that transaction t reads as well as those that it changes in U. In that case, another client could determine whether t should commit or abort based on whether the changes X of 704 conflict with this new set U. In that case, the other client could cause transaction t to commit. So, if c stops making progress, another client will be able to do the work for c.

Transaction Protocol: DistributeTransaction Procedure

In this solution, running a transaction entails the following steps:

1. The client 14 simulates the intended transaction on its local database copy, then undoes this transaction on its own database copy. (Issuing the RollbackLocal client 14 command defined in the Model section). It will properly apply the transaction only once it has applied the pending transactions first. In 701, client c performs a transaction t on the current state of the database in c. In 702, c records any changes U to the database (or in the alternative the reads as well as writes done by transaction t).

2. Once ready to commit, the client 14 issues the "Request slot" command to the provider, attaching an encrypted pre-commit transaction description P of its intended transaction, and the slot number k which is the latest the client 14 knows about. In 703, c encrypts U and sends the encrypted result to the outsourcing provider P along with an indication that c reflects the state of the first k transactions.

3. The provider allocates a slot s, and sends back a list of all new pre-commit descriptions $P_k \ldots P_{s-1}$ up to s. The provider must also send any previously committed transactions that the client 14 hasn't seen yet at this point (i.e., since slot k). In 704, the provider P sends back a description of the updates X of all pre-committed or committed transactions since transaction k.

4. The client 14 verifies the signatures on each pre-commit, and checks whether its transaction conflicts with these pre-committed or committed transactions (conflict semantics were discussed in Section 3). E.g., a conflict occurs with pre-commit $P_j$, $k \leq j \leq s$ if the external state would be different depending on which of $P_j$ or PS is run first (the DetectConflict command identifies these conflicts). If there are no conflicts, the client 14 commits by sending a final encrypted transaction commit $C_s$. If there are conflicts, the client 14 still sends the commit $C_s$, but sets its abort flag first (see below). In the case of a conflict, the client 14 also rolls back the external effects of running the transaction locally (using the Retry command).

5. The provider commits by logging the encrypted transaction to permanent storage. It informs all other clients 14 about the new transaction by sending the final encrypted transaction $C_s$.

The pre-commit transaction description $P_i$ contains the following information, encrypted and signed with the symmetric key K shared by all clients 14: desc=a transaction description, e.g., a sequence of SQL statements.

The final encrypted, signed transaction $C_i$ contains the following information: commit=a single bit indicating whether this is a commit or an abort, pre-hashchain=hash chain link HC–$Pre_i$, verifying the sequence of precommits $P_1 \ldots P_i$. Note that when issuing commit i, the client 14 has seen all pre-commits up through i, because the precommits up to i are returned when the client 14 is assigned slot i. However, the client 14 may not have yet seen all commits up to i when issuing this commit $C_i$. The pre-commits are sufficient to determine whether there are conflicts.

Client c applies transaction i (invoking client command RunAndCommitLocalTransaction, originating from client d, once the following conditions hold: (i) the contents of $P_i$ and $C_i$ have a valid signature from a valid client 14 (using client-shared symmetric key K), (ii) $C_i$.commit indicates this is a committed transaction (not aborted), (iii) the client 14 has applied transactions 1 ... i–1, and (iv) the hash chain link $C_{i-1}$.pre-hashchain matches the client's own computation of link $HC_{i-1}$.

It is noted that this protocol is wait-free: if a client 14 reserves a slot, sends its pre-commit but never completes, other clients 14 can still perform transactions as long as they never access data that conflicts with the pre-committed transaction. In the alternate environment in which a different client may determine the commit status of a transaction pre-committed by client c, even this restriction can be removed.

Result: Verifies and runs the transaction, reported by the server

```
if !verifySignature(p) or !verifySignature(c) then
        return ⊥
end
P := decrypt(p)
C := decrypt(c)
if prehashchain[id] != T.prehashchain then
        return ⊥
end
if id == links + 1 then
        prehashchain.append (H_k(prehashchain[links] ||
            T.desc))
        links++
end
if C.commit then
        RunAndCommitLocaltransaction(T.desc)
end
```

Result: Runs a transaction initiated locally

```
RollbackLocal(h)
P: = new Pretransaction
P.desc :=T
```

```
s.pending :=
server_requestSlot(Enc_K(P),prehashchain.length)
conflict := false
foreach p,id ∈ pending do
            if !verifySignature(p) then
                    return ⊥
            end
            p_id :=decrypt(p)
            prehashchain.append(H_k(prehashchain[links] ||
                T.desc))
            links++
            if DetectConflicts(h, p_id.desc) then
                    conflict := true
            end
end
c := new Commit
c.commit := !conflict
c.prehashchain ::= prehashchain
server_commit(Enc_K(c))
if conflict then
            return Retry(h)
end
```

Privacy

Notice that content, read/write access patterns and transaction dependencies are hidden from the provider. This follows by construction as the contents of all messages are encrypted.

Clients 14 running this protocol will never deadlock, as long as they are not blocking for any external resources, since there is always the ability to make progress. This is evident since each transaction depends only on the transactions preceding it; the serialization numbers ensure there can never be any circular dependencies. At any point in time, there is always at least one transaction, at the front of the list, without any pending transactions to interfere.

For clients 14 that are waiting on external resources, it is guaranteed they will avoid deadlock as long as they hold only external resources (directly or indirectly) that are not needed by prior, pending transactions. That is, our serialization technique assigns all transactions an ordering that makes it easy to prevent external resource deadlock as well.

"Livelock" and starvation are relevant concerns, however, and their applicability will depend on particular implementations. If a client 14 detects it is being continually starved (i.e., there are always pending conflicting transactions), one solution is to block while waiting for the transaction chain to solidify up to a particular slot, since forward progress is guaranteed for the pending transactions. To block, the client 14 reserves a slot, then waits until all slots up to its reserved slot have committed before running its transaction. This guarantees that there will be no pending conflicting transaction, thus guaranteeing the client 14 will be able to make progress. The vague pre-commit extension [143] should be employed to allow clients 14 to reserve a slot before they have run the transaction locally. Conversely, a client 14 must never block for a transaction past its slot. This forward independence prevents deadlock, and it also gives flexibility to client 14 implementations; if a client 14 needs a lock on a set of records, for example, it can request a transaction slot, then block until all transactions prior to the slot are committed. The client 14 can then perform reads and writes with the equivalent of a lock. Meanwhile, other clients 14 can prepare transactions to run in the future, under the restriction that their transactions do not conflict with the pending transaction.

Random backoff is an alternate solution. This will let clients 14 escape from livelock, but since it requires participation from multiple parties, it will not help starved clients 14. Overall, blocking is simpler and more effective at breaking a cycle. In random backoff, after a client 14 aborts a transaction due to a conflict, it chooses a random amount of time to wait before trying again. If it fails multiple times sequentially, it increases (exponentially) the amount of time to wait. This technique will not prevent starvation of any particular client 14, but it will allow clients 14 to escape livelock, in which forward progress is halted as two or more clients 14 continuously conflict with each other.

Client Initialization

When a new client 14 comes online, there may be a long list of updates it must apply from the transaction log. To the time required for client 14 initialization, it is recommended clients 14 create and sign periodic database snapshots, up to any particular transaction number. The untrusted provider hosts these encrypted database snapshots, which can be used by clients 14 to recover a particular version of the database. The remaining uncovered portion of the log can then be used in order for some client to be fully up to date. For example, if there is a database snapshot up to transaction k of the encrypted transaction log, then a recovering client needs only to decrypt the snapshot and then process the committed transactions, if any, starting with transaction k+1.

Database snapshots can similarly be used to reduce the storage requirements of the untrusted provider. Once a snapshot of version i exists, the transaction log entries from 0 to i can be discarded. (Using database snapshots in combination with the transaction log to allow faster recovery is a traditional DBSM method in common use.)

Privilege Revocation

Depending on the particular implementation, it may also be useful for the decision to revoke access from a client 14 to be made externally, by a trusted party/system administrator, or internally, by a quorum of clients 14. Once the remaining clients 14 agree to revoke access, they choose a new symmetric encryption key. Additionally, clients 14 agree on a slot at which the client 14 is considered terminated. This termination point can be determined by a system administrator, or by a quorum of clients 14. Modifications to the database after this slot, by the terminated client 14, are all rejected (ignored) by everyone else. Incomplete transactions are easy to discard once the remaining clients 14 can come to an agreement about which is incomplete.

After revocation, the only abilities retained by the terminated client 14 from its former access is read access on the database for transactions before the termination point, and potentially the ability to cause denial of service by sending many messages.

To remove the advantage the revoked client 14 has in performing a denial of service attack on the database, the service provider should be notified. This operation is not strictly necessary, since correctness is still provided even when the revoked client 14 and the storage provider are colluding.

Alternate Lock-Free, Abort-Free, Wait-Free Implementation

In the preferred embodiment, there is the possibility of aborts and livelock. The strawman implementation requires a global lock. The following alternate embodiment is lock-free, never aborts a transaction (so never suffers from livelock), and one transaction is never stopped even if another transaction stops.

In the preferred embodiment, a client 14 executes a read transaction locally on its own site and does not communicate further. For update transactions, the client 14 executes the transaction locally but does not allow the transaction to commit, then the client 14 collects the database accessing statements from the transaction (the selects, updates, inserts, and deletes in the SQL case) and then sends those to the Provider. In this alternative embodiment (triple-free), a client 14 executes a read transaction locally and does not need to communicate just as in the preferred embodiment. By contrast, update transactions are handled quite differently from the preferred embodiment. They are not executed locally before being sent to the Provider. Instead, the full text of those transactions (or the function call corresponding to the transaction if all clients 14 share the same code) is sent to the Provider. The Provider orders these texts and then sends those texts to all clients 14. Each client 14 simply executes them serially. In regard to FIG. 8 there is shown a Wait-free, abort-free, lock-free (triple-free) variant of the preferred invention. In 801, the client encrypts and sends the text of a transaction and obtains a slot number s. In 802, the provider sends this text to all clients. The clients execute the texts in the order of slot numbers.

To illustrate the difference between this approach and those of the strawman implementation as well as the preferred embodiment, consider a transaction text written in an "SQL-language" style including control logic:
begin transaction
x=select . . . from R, S . . .
if (x>5) then update S . . .
else update R . . .
commit transaction In the strawman and preferred embodiments, the client 14 would send only the SQL statements to the Provider. That is, either:
select . . . from R, S . . .
update R . . .
or
select . . . from R, S . . .
update S . . .

So, the control logic would not be present. In this alternate embodiment, the transactional text with the control logic would be sent:
begin transaction
x=select . . . from R, S . . .
if (x>5) then update S . . .
else update R . . .
commit transaction The benefit of sending the full text of some transaction t is the following: suppose that between the time transaction t is sent to the provider and the time t is sent to all clients some other transaction s executes and conflicts with t. In that case, the text of t will execute on the state produced by s. It may be that s causes the update S statement to be made instead of the update R statement. That will be detected if the text for transaction t is sent, but would not be detected if only the updates were sent. Additional properties should hold for the transactions. These will be made clear through the following definitions.

The "text" of a transaction is the source code including SQL statements and control flow that corresponds to the transaction. If the transaction is executed by a function call and all clients 14 share the text of that function, then the text is simply the function name with the arguments to the function.

"Inputs" are values sent with the text of instructions (or arguments to a function in the second case above).

A transaction is "deterministic" if its reads and writes from the database and its return values to the client program depend only on its inputs and on the database state. That is, a deterministic transaction should have no dependency on times, random numbers, further (e.g. interactive) user inputs, or variables in the client programs outside the transaction text.

Example of deterministic transaction:
begin transaction
x:=select value from R . . .
if(x>5) then
update U1 . . .
else
update V1 . . .
end transaction Example of non-deterministic transaction:
begin transaction
x:=select value from R . . .
if((x)>5) & (time>11 AM) then
update U2 . . .
else
update V2
end transaction If a transaction is non-deterministic, then preferably it can be converted to a deterministic transaction by converting non-deterministic elements (such as the generation of random numbers or the observation of a clock) into fixed inputs that will be sent along with the transaction text. Thus, if all transactions are (or can be converted to be) deterministic transactions, this alternate embodiment is wait-free, lock-free, and abort-free (triple-free) and is governed by the steps in FIG. 8. In addition, to prevent partitioning/forking attacks, fork consistency is maintained through the protocol in FIG. 9 and partitioning attacks are discovered through repeated and periodic execution of the protocol in FIG. 10.

If however, some transactions remain non-deterministic, then we consider a hybrid between this triple-free protocol and the second preferred embodiment. Specifically, we treat non-deterministic transactions as in the preferred embodiment. That is, both deterministic and non-deterministic transactions are placed together on the encrypted transaction log, but non-deterministic transactions follow the rules of the preferred embodiment, so may abort. Each transaction may execute only after all previous deterministic transactions have executed and the commit status of all previous non-deterministic transactions has been determined. This hybrid approach may allow the alternate embodiment of the preferred embodiment in which a client c2 determines the commit or abort status of a transaction emitted by a client c1.

Protocol Extensions
Malicious Clients 14

Here is a simple extension to the preferred embodiment that allows us to prevent a malicious client 14 from bringing the rest of the system into an inconsistent state. Preventing data overwriting by a malicious client 14 is a separate concern that can be addressed at the database access control level.

To detect malicious client 14 behavior before the system becomes inconsistent, two modifications are required. First, the transaction integrity is extended to include non-repudiation, so that each message is traced back to the issuing client 14. Specifically, the symmetric MAC function (which uses a shared secret to detect message tampering, by attaching a hash of the message contents with a function of the shared secret to the encrypted message, such that no party can generate a valid MAC without knowing the secret) is replaced with a public key signing system (in which each client uses a digital signature unique to that client to sign the information about its transactions and its commit/abort messages). This prevents one client 14 from impersonating another, and is required both to enforce the access control policy, and to establish accountability if incorrect behavior is detected.

The pre-commit hash chain already ensures that all clients 14 agree on the pending transaction; to additionally protect from misbehaving clients 14 colluding with the server 12, it is necessary to ensure that all clients 14 also agree on the commit/abort status of each transaction. In the preferred embodiment that commit/abort status is not encoded in the hash chain.

Since the preferred embodiment is lock-free and wait-free, clients 14 will not necessarily know the commit/abort status of every transaction prior to their own as they issue a commit. Therefore, a delayed-verification mechanism is employed: as part of commit $C_i$, the client includes the following items: (i) commit-hashchain-position=the position j<i of the last element in the chain for which this client has received a commit message (i.e., this client has received $C_1 \ldots C_j$ but has not yet received $C_{j+1}$), and (ii) commithashchain=The value of hash chain element j.

Clients 14 must also cache some prior hash links in order to verify the link included with commit $C_i$, since $C_i$. commit-hashchain-position might be less than i−1. The verification is performed by computing the indicated hashchain position and comparing to the included value; computation of this position requires knowing the value of the previous position. This cache size can be configured, and for most transaction scenarios it is likely safe to keep only a few entries. Values that are too old for the cache can be signed with a MAC and stored on the server 12, to allow clients 14 to verify transactions submitted by clients 14 that are well out of date. Each client 14 adds its own MAC to the hash chain value before storing to the server 12, so that the client 14 can later verify that the hash chain value is the same value the client 14 previously computed. The server 12 maintains a table of archived hash values for each client, indexed by the transaction slot number. Each row in this table is a tuple <Slot ID, Hash Value, MAC>. Clients 14 store values to this server archive table as they evict them from their own cache, and retrieve values if they later need to reference them to verify a hash chain value from another client.

Note this provides a slightly weaker guarantee concerning the status of commit/abort. In the presence of a malicious client 14 colluding with the server 12, clients c and d will not necessarily be k-trace consistent. However, after both c and d have applied the inconsistent transaction j, the next update issued by client d (which must contain a commit-hashchain-position_j) will reveal the inconsistency to client c.

In summary, malicious clients 14 are prevented from causing inconsistency using an access control policy framework to limit data damage, clients are required to sign their updates to ensure non-repudiability of messages to prevent cross-client impersonation, and the establishment of an additional hash chain ensures clients 14 agree on transaction commit/abort status.

Lowering Transaction Latency

The number of network 22 round trips required for a transaction commit in the preferred embodiment can be reduced from two to one by eliminating the commit messages Ci, as long as all clients 14 have identical conflict detection logic. If another field to Pi is added indicating the last transaction the submitter has applied to its local database copy before this attempted transaction, other clients 14 have enough information to determine the conflict status of this transaction. Thus, the commit flag in Ci.commit is redundant, at the expense of performing the conflict detection across all clients 14 instead of just one.

In order to provide consistency verification, clients 14 include a hash chain link value in the Pi instead of Ci as in the preferred embodiment. Unlike the preferred embodiment, in which all precommits up to Pi are known at the time of transaction commit, there may be pending transactions before position i. Therefore submitting clients 14 provide a field $P_i$.pre-hashchain of the latest hash chain position they can calculate (the hash chain link covering all transactions through the last applied transaction), and a Pi.pre-hashchain-location, specifying the latest known position. Because the hash chain does not necessarily go all the way to transaction i at the time of submission, inconsistency checking is delayed slightly, and it requires longer to detect malicious behavior. Specifically, an inconsistency introduced by server misbehavior will be detected only once a client that has applied the inconsistent transaction has sent a later update out to other clients 14 who have seen a different transaction in that slot. This guarantee about detecting server 12 misbehavior in this section is similar to the guarantee about detecting client misbehavior in 7.1. Specifically, after both client c and client d have applied the inconsistent transaction j, the next update issued by client d (which will contain a commithashchain-position for position j) will reveal the inconsistency to client c.

In conclusion, a simple modification to this protocol improves transaction latency by eliminating the commit message, at the expense of slightly more client computation time and slightly weaker consistency guarantees. (The wait-free, lock-free, abort-free protocol does not require a commit message for deterministic transactions.)

Large Databases

So far we have not discussed the issue of local space limitations which is an issue in both the preferred and the wait-free, lock-free, abort-free embodiments. We assumed up to now that clients 14 can fit the entire database in local (volatile) storage, so that they can run queries without any help from other parties. If this is not the case, protocol extensions are necessary to allow clients 14 to run queries. We discuss several mechanisms below.

On-demand data. Clients 14 can use a separate query protocol to pull pieces of recent database snapshots from other clients 14, or authenticated database snapshots directly from the provider. This work-around has two drawbacks: first, access pattern privacy is forfeited if clients 14 query the provider directly for only portions of the database. (Access privacy is preserved if clients ask for the entire database however.) Second, performance suffers since sections of the database must travel the network 22 multiple times.

Large object references. If clients 14 can store the entire database except for a set of large objects, the client can fetch these encrypted objects from the provider using a separate protocol. Access pattern privacy to these objects is lost, though access pattern privacy to the database indexes is preserved. In practice, privacy to the indexes is the most important part of privacy. Thus, this technique offers a useful privacy/storage tradeoff.

Performance will be mostly unharmed by the large object references work-around, as long as the bulk of the transaction processing work concerns only index data. The client's available storage may be used to cache some of the most popular items, so most objects will only traverse the network 22 a small number of times under most usage patterns. This technique suggest a modification to the transaction protocol to improve performance, to surpass in some scenarios even the performance of the original model: for operations on set of large objects, clients 14 announce the writes in the transaction log, but include only a hash of the large object content. This way, since the large object content is excluded from the transaction log, clients 14 will not download the large objects at all, unless they are specifically needed for a query.

The only modification to the transaction protocol necessary to perform this operation is that clients 14 include the object ID and a hash of the object content, as the content in the transaction field of the encrypted transaction log. Thus, the link (with a checksum and version) to the object is the stored content in the log and databases, and the object itself is an external entity. Clients 14 treat the external object as if the updates occur when the link occurs in the transaction log. If the transaction aborts, then other clients treat that update as if it never occurred.

Large object references with PIR. A Private Information Retrieval algorithm can be used to retrieve these large objects without revealing which objects are being retrieved, as long as the PIR algorithm does not reveal the size of the object, or the size of the object is not unique enough to allow an access pattern privacy-defeating correlation between the objects. The advantage of the overall scheme in this context is that access pattern privacy is preserved efficiently for the bulk of the computation; when large objects are retrieved (presumably less frequently), the more expensive PIR (such as [74]) is employed to preserve access pattern privacy. This can be used with any of the embodiments (strawman, preferred, triple-free, and their variants.)

The key to the practicality of all of these alternatives is that all the database indexes required to satisfy a particular query can fit entirely on a client 14, and that the client 14 has enough working memory to perform other operations efficiently.

Expiring Slots

There is a potential denial of service behavior if a client c 14 reserves a transaction slot but never commits; no transactions past this slot will be applied. One solution already mentioned is to have another client c2 determine the commit status of the transaction of c. A potential alternative solution is using "mortal locks" that expire.

The following scenario outlines a method by which clients 14 can safely delete expired locks: a pre-transaction reserved slot is valid only for a predetermined amount of time, specified by the client 14 as it reserves its slot (or set as parameter). Clients 14 timestamp the pre-transaction.

If this time has expired, and the transaction is still in the pre-transaction phase, any client 14 is now allowed to abort this transaction. The client 14 desiring to abort the transaction simply issues to the storage provider an abort entry for this slot, which is then appended to the transaction log. The provider ensures that only the abort or the commit are appended to the log. The provider decides race conditions, and one of the operations will fail if both the abort and commit are issued. By maintaining and verifying a commit hash chain attached to each transaction (described in [121]), in addition to the pre-transaction hash chain, clients 14 verify their agreement on whether each transaction slot committed or aborted. Thus, if the provider is dishonest in the execution of his duties, and reports the outcome of the race inconsistently, clients 14 will detect this malicious behavior in the hash chain since the hash value of this transaction will differ between clients.

A server/provider 12 can potentially create the illusion of a crashed client 14, by delaying updates from that client 14 to the other clients 14. This denial of service behavior does not allow the server 12 to create an inconsistent database view via lock expiring: if the (untrusted) provider ever accepts both the abort message and the commit for a particular transaction, it will be evident from the conflicting commit hash chains once the provider sends updates out (thus maintaining fork consistency). A client that is repeatedly delayed may announce its displeasure to the other clients using out-of-band communication, thus revealing a denial-of-service behavior.

Vague Pre-Commit

An extension is described here that allows clients 14 to issue vague pre-commits, determining the final transaction contents only after their request slot has been reserved. This technique allows improved performance in certain conflict-heavy scenarios, by giving clients 14 the flexibility to choose their transaction after they are informed of current operations. Clients 14 might choose to modify their transaction to avoid conflicts, as an example.

In the above described lock-free protocol, clients 14 submit a pre-commit indicating their pending transaction, then issue a commit or abort on this transaction after checking for conflicts. With an extension we can allow the commit version of the transaction to differ from the pre-commit version, adding the following field to the commit message Ci: description=The actual transaction to run (instead of the Pi.description).

The only requirement added is that Ci.description be a "subset" of Pi.description. That is, any conflict that the final commit Ci might cause with future transactions would also be caused by the pre-commit Pi.description. With this requirement enforced, all client 14 behavior is identical to what it would have been if the original Pi.description was Ci.description, with the exception that there might be more aborts than otherwise. This subset requirement ensures consistency, by guaranteeing that any transaction ordering that would cause a conflict in the preferred embodiment will also cause a conflict in the vague pre-commit extension.

Additionally, in the malicious client 14 scenario, it is required that all clients 14 can determine whether any commit Ci.description is indeed a subset of the pre-commit Pi.description, as they don't trust the issuer to make that declaration.

Trusted Serializability Manager

In the preferred embodiment, we assume that the provider is untrusted. Thus the data going to the repository is logged in an encrypted form. However, the serialization services of the provider might be supported by a component that is trusted. We call that component the "conduit" (box 304). The benefit of a trusted conduit is that the conduit rather than the client 14 could check for conflicts. Thus, there will be the untrusted provider which manages the data repository, the conduit which handles serialization, and the clients 14. This then suggests the following alternate to the preferred embodiment:

1. The client 14 simulates the intended transaction on its local database copy, then undoes this transaction on its own database copy. (Issuing the RollbackLocal client 14 command defined in the Model section). It will properly apply the transaction only once it has applied the pending transactions first.

2. Once ready to commit, the client 14 issues the "Request slot" command to the conduit, attaching a pre-commit transaction description P of its intended transaction, and the slot number 1 which is the latest the client 14 knows about. This message is sent in a form that the conduit understands (e.g. in the clear or in a form that the conduit can decrypt).

3. The conduit allocates a slot s, and determines any conflicts with committed transaction since slot 1. If there are no conflicts, the conduit commits the transaction. If there are conflicts, then the conduit aborts the transaction and frees the slot.

4. From time to time or in response to client 14 requests, the conduit sends the updates from committed transaction to clients 14.

5. The clients 14 execute the updates in order after verification.

6. The conduit commits by logging the transaction to the untrusted permanent repository in a form that the permanent repository cannot understand. The conduit may use a hash chain to do so in order to be sure the provider/permanent repository does not discard or modify any transactions. Additionally, the conduit may periodically use a proof of data ownership protocol such as one described in [76] to verify the provider/permanent repository hasn't discarded data to save on storage costs.

Implementation and Experiments

Strawman Implementation (ODP). We built a proof-of-concept strawman implementation of the Outsourced Durability Protocol (ODP) using different components in Java, Python and C. The implementation handles SQL queries and relational data sets and runs on top of MySQL 5.0, though with minor modifications we can support other RDBMS's. The protocol enables parties with low uptime to keep databases synchronized through a single, untrusted third party that has high uptime. Thusly we allow safe outsourcing of both data backups and data synchronization through an untrusted provider.

In our particular setup we aimed towards simplicity rather than performance, giving each client 14 application its own connection to a single database in the client's cluster. These connections are filtered through a proxy, which captures queries for our protocol to ensure proper propagation and conflict avoidance. Each cluster runs a single process that communicates with an untrusted service provider conduit through symmetric XML-RPC channels.

To filter queries we use MySQL Proxy, an open source scriptable tool built by the creators of MySQL, allowing capture and insertion of SQL queries and database responses. This simple setup shows that we can deploy quickly on existing systems while obtaining reasonable performance; a tailored solution would improve overhead by eliminating the numerous process forks, file writes, and TCP connections initializations in every transaction in the simple strawman implementation.

The setup consists of an (untrusted) "server" and several "clients" connected directly through a 1 Gbps router. The server is a Dell PowerEdge 2850 running Centos 4.1 with 4 Dual core Xeons and 4 GB RAM, The clients were Lenovo Thinkpads with an Intel Pentium Core 2 Duo 1.8 GHz CPU running Redhat Fedora 9, and Pentium 4 Redhat Fedora 8 desktop machines. We measured overall throughput in a setting where the two clients simultaneously issued transactions to the server 12 running our ODP software, connecting to a MySQL database through MySQL Proxy software. As a baseline control setup we ran the same clients connected directly to the server-hosted MySQL database.

We soon discovered that in this setup the 1 GBps network bandwidth is easily surpassing the processing ability of our baseline, thus we focused mainly on understanding the behavior of ODP vs. baseline MySQL as a function of network latency. To this end we modulated network latency at the kernel level using the NetEm [43] network emulation tool, which delays packets in the outgoing network queue. (Effective bandwidth was also slightly decreased by the latency, since the TCP window sizes are fixed.)

FIG. 2 shows the throughput in queries per second obtained using a remote MySQL database with no server 12 guarantees, and the throughput obtained in our strawman ODP implementation with full privacy and correctness assurances. We vary link latency from 0.1 ms to 100 ms, sampling at decreasingly frequent intervals to suit the log scale X axis.

FIG. 2: Query throughput in transactions per second vs. link latency, with log scale axes. Both MySQL and ODP quickly converge to a relationship inversely proportional to link latency.

The strawman ODP implementation could support over 30 queries per second with full assurances.

Multiple process forks. We used Java to manage all the communication aspects, as its pre-existing constructs reduce coding and debugging time. Additionally, a C-based Lex/Yacc parser was the most natural mechanism to detect conflicts between SQL transactions. To obtain the most functionality in the shortest amount of time, we decided to launch a new Lex/Yacc based conflict detection process from Java for every SQL statement. The result is that we incur several process forks for each processed transaction, launching both a shell and the parser once for each statement in each transaction on each client 14. Additionally, the conflict detection operates as a separate C-based executable. While process forks themselves are relatively cheap, incurring several in succession while the client 14 waits for the commit creates a low performance cap. We profiled the time required to launch a shell and application at approximately 2 ms—this accounts for a large portion of our overhead.

Synchronous client 14. The MySQL command line and stdin piping was used as our application client 14. This incurs the full latency of each transaction as a transaction throughput cap. Having two concurrent clients 14 alleviates this slightly, but issuing multiple simultaneous transactions from each client 14 would decrease the impact of latency on throughput. Additionally, part of this benefit can be received by continuing each single-threaded client 14 before the commit has been applied—even at the risk of causing more conflicts, e.g., by creating the possibility for client 14 conflicts with itself.

Multiple TCP connection setups. Instead of reusing client-server TCP connections, the strawman creates a new connection on each request. Multiple requests are constructed per transaction.

Lua scripting overhead. The MySQL Proxy allows the capture of sessions without re-building a custom MySQL listener. This allowed fast integration with MySQL-enabled applications. The interface to MySQL proxy consists of a Lua [50] script parsed at runtime.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

References

All of Which are Incorporated by Reference Herein

[22] M. Blaze. A Cryptographic File System for Unix. In Proceedings of the first ACM Conference on Computer and Communications Security, pages 9-16, Fairfax, Va., 1993. ACM.

[23] B. H. Bloom. Space/time trade-offs in hash coding with allowable errors. Commun. ACM, 13(7):422-426, 1970;

[24] D. Boneh, G. Di Crescenzo, R. Ostrovsky, and G. Persiano. Public key encryption with keyword search. In Proceedings of Eurocrypt 2004, pages 506-522. LNCS 3027, 2004.

[25] D. Boneh, C. Gentry, B. Lynn, and H. Shacham. Aggregate and verifiably encrypted signatures from bilinear maps. In EuroCrypt, 2003.

[26] R. Brinkman, J. Doumen, and W. Jonker. Using secret sharing for searching in encrypted data. In Secure Data Management, 2004.

[27] G. Cattaneo, L. Catuogno, A. Del Sorbo, and P. Persiano. The Design and Implementation of a Transparent Cryptographic Filesystem for UNIX. In Proceedings of the Annual USENIX Technical Conference, FREENIX Track, pages 245-252, Boston, Mass., June 2001.

[28] Y. Chang and M. Mitzenracher. Privacy preserving keyword searches on remote encrypted data. Proceedings of the Third Intl. Conference on Applied Cryptography and Network Security, pages 442-455, 2005.

[29] Christopher Hood. The Tools of Government in the Information Age. In The Oxford Handbook of Public Policy, pages 469-481. Eds. Michael Moran, Martin Rein, Robert E. Goodin. Oxford University Press, 2006.

[31] Premkumar T. Devanbu, Michael Gertz, April Kwong, Chip Martel, G. Nuckolls, and Stuart G. Stubblebine. Flexible authentication of XML documents. In ACM Conference on Computer and Communications Security, pages 136-145, 2001.

[32] Premkumar T. Devanbu, Michael Gertz, Chip Martel, and Stuart G. Stubblebine. Authentic third-party data publication. In IFIP Workshop on Database Security, pages 101-112, 2000.

[33] Einar Mykletun and Maithili Narasimha and Gene Tsudik. Signature Bouquets: Immutability for Aggregated/Condensed Signatures. In Proceedings of the European Symposium on Research in Computer Security ESORICS, pages 160-176, 2004.

[34] Gartner, Inc. Server Storage and RAID Worldwide. Technical report, Gartner Group/Dataquest, 1999.

[35] S. Ghemawat, H. Gobioff, and S. T. Leung. The Google File System. In Proceedings of the $19^{th}$ ACM Symposium on Operating Systems Principles (SOSP '03), pages 29-43, Bolton Landing, N.Y., October 2003. ACM SIGOPS.

[36] E. Goh. Secure indexes. Cryptology ePrint Archive, Report 2003/216, 2003.

[37] O. Goldreich. Foundations of Cryptography. Cambridge University Press, 2001.

[38] P. Golle, J. Staddon, and B. Waters. Secure conjunctive keyword search over encrypted data. In Proceedings of ACNS, pages 31-45. Springer-Verlag; Lecture Notes in Computer Science 3089, 2004.

[39] Philippe Golle and Ilya Mironov. Uncheatable distributed computations. In Proceedings of the 2001 Conference on Topics in Cryptology, pages 425-440. Springer-Verlag, 2001.

[41] H. Hacigumus, B. Iyer, C. Li, and S. Mehrotra. Executing SQL over encrypted data in the database-service-provider model. In Proceedings of the ACM SIGMOD international conference on Management of data, pages 216-227. ACM Press, 2002.

[42] J. S. Heidemann and G. J. Popek. File system development with stackable layers. ACM Transactions on Computer Systems, 12(1):58-89, February 1994.

[43] Stephen Hemminger. Network emulation with netem. Proceedings of the linux.conf.au Linux Conference Australia, April 2005.

[44] B. Hore, S. Mehrotra, and G. Tsudik. A privacy-preserving index for range queries. In Proceedings of ACM SIGMOD, 2004.

[45] HweeHwa Pang and Arpit Jain and Krithi Ramamritham and Kian-Lee Tan. Verifying Completeness of Relational Query Results in Data Publishing. In Proceedings of ACM SIGMOD, 2005.

[47] A. Kashyap, S. Patil, G. Sivathanu, and E. Zadok. I3FS: An In-Kernel Integrity Checker and Intrusion Detection File System. In Proceedings of the 18th USENIX Large Installation System Administration Conference (LISA 2004), pages 69-79, Atlanta, Ga., November 2004. USENIX Association.

[48] G. Kim and E. Spafford. Experiences with Tripwire: Using Integrity Checkers for Intrusion Detection. In Proceedings of the Usenix System Administration, Networking and Security (SANS III), 1994.

[49] G. Kim and E. Spafford. The Design and Implementation of Tripwire: A File System Integrity Checker. In Proceedings of the 2nd ACM Conference on Computer Communications and Society (CCS), November 1994.

[51] Kyriacos Pavlou and Richard T. Snodgrass. Forensic Analysis of Database Tampering. In Proceedings of ACM SIGMOD, 2006.

[52] J. Li, M. Krohn, D. Mazieres, and D. Shasha. Secure Untrusted Data Repository (SUNDR). In Proceedings of the 6th Symposium on Operating Systems Design and Implementation (OSDI 2004), pages 121-136, San Francisco, Calif., December 2004. ACM SIGOPS.

[53] M. Sullivan and M. Stonebraker. Using Write Protected Data Structures to Improve Software Fault Tolerance in Highly Available Database Management Systems. In Proceedings of VLDB, 1991.

[54] Maithili Narasimha and Gene Tsudik. DSAC: integrity for outsourced databases with signature aggregation and chaining. Technical report, 2005.

[55] Maithili Narasimha and Gene Tsudik. Authentication of Outsourced Databases using Signature Aggregation and Chaining. In Proceedings of DASFAA, 2006.

[56] C. Martel, G. Nuckolls, P. Devanbu, M. Gertz, A. Kwong, and S. Stubblebine. A general model for authenticated data structures. Technical report, 2001.

[57] Charles Martel, Glen Nuckolls, Premkumar Devanbu, Michael Gertz, April Kwong, and Stuart G. Stubblebine. A general model for authenticated data structures. Algorithmica, 39(1):21-41, 2004.

[58] A. D. McDonald and M. G. Kuhn. StegFS: A Steganographic File System for Linux. In Information Hiding, pages 462-477, 1999.

[59] R. Merkle. Protocols for public key cryptosystems. In IEEE Symposium on Research in Security and Privacy, 1980.

[61] E. Mykletun, M. Narasimha, and G. Tsudik. Authentication and integrity in outsourced databases. In ISOC Symposium on Network and Distributed Systems Security NDSS, 2004.

[62] E. Mykletun, M. Narasimha, and G. Tsudik. Authentication and integrity in outsourced databases. In Proceedings of Network and Distributed System Security (NDSS), 2004.

[63] E. Mykletun, M. Narasimha, and G. Tsudik. Signature bouquets: Immutability for aggregated/condensed signatures. In Computer Security—ESORICS 2004, volume 3193 of Lecture Notes in Computer Science, pages 160-176. Springer, 2004.

[64] P. Paillier. Public-key cryptosystems based on composite degree residuosity classes. In Proceedings of EuroCrypt, 1999.

[65] Pascal Paillier. A trapdoor permutation equivalent to factoring. In PKC '99: Proceedings of the Second International Workshop on Practice and Theory in Public Key Cryptography, pages 219-222, London, UK, 1999. Springer-Verlag.

[66] HweeHwa Pang and Kian-Lee Tan. Authenticating query results in edge computing. In ICDE '04: Proceedings of the 20th International Conference on Data Engineering, page 560, Washington, D.C., USA, 2004. IEEE Computer Society.

[67] Philip Bohannon and Rajeev Rastogi and S. Seshadri and Avi Silberschatz and S. Sudarshan. Using Codewords to Protect Database Data from a Class of Software Errors. In Proceedings of ICDE, 1999.

[68] S. Quinlan and S. Dorward. Venti: a new approach to archival storage. In Proceedings of the First USENIX Conference on File and Storage Technologies (FAST 2002), pages 89-101, Monterey, Calif., January 2002. USENIX Association.

[69] Richard T. Snodgrass and Stanley Yao and Christian Collberg. Tamper Detection in Audit Logs. In Proceedings of VLDB, 2004.

[70] Radu Sion. Query execution assurance for outsourced databases. In Proceedings of the Very Large Databases Conference VLDB, 2005.

[71] G. Sivathanu, C. P. Wright, and E. Zadok. Enhancing File System Integrity Through Checksums. Technical Report FSL-04-04, Computer Science Department, Stony Brook University, May 2004.

[72] D. Xiaodong Song, D. Wagner, and A. Perrig. Practical techniques for searches on encrypted data. In SP '00: Proceedings of the 2000 IEEE Symposium on Security and Privacy (S&P 2000). IEEE Computer Society, 2000.

[73] Tingjian Ge and Stan Zdonik. Answering aggregation queries in a secure system model. In VLDB '07: Proceedings of the 33rd international conference on Very large data bases, pages 519-530. VLDB Endowment, 2007.

[74] Peter Williams and Radu Sion. Usable PIR. In Proceedings of the 2008 Network and Distributed System Security (NDSS) Symposium, 2008.

[75] C. P. Wright, M. Martino, and E. Zadok. NCryptfs: A Secure and Convenient Cryptographic File System. In Proceedings of the Annual USENIX Technical Conference, pages 197-210, San Antonio, Tex., June 2003. USENIX Association.

[76] C. Stem, P. Adelt, V. Krummel, M. R. Ackermann. Reliable Evidence of Data Integrity from an Untrusted Storage Service. 2008. ICNS 2008. Fourth International Conference on Networking and Services. Volume, Issue, 16-21 Mar. 2008 Page(s):24-29.

The invention claimed is:

1. A storage system comprising:
a network;
a server having a server memory, a server processing unit and a server network interface in communication with the network; and
a plurality of clients, each client having a client memory in which data is stored, a client processing unit and a client network interface in communication with the server through the network, each of the clients having an encryption portion that enables each of the clients to securely communicate and understand data with all other clients, the server memory being shared by the clients through the network to store copies of encrypted data in the server memory from the clients, the server unable to decrypt the encrypted data stored in the server memory, the server having a timing mechanism to ensure data that is shared is a desired copy, the server cannot infer which data is accessed by the clients because clients perform read transactions only locally in the client's client memory and cannot infer whether two transactions from the clients access a same portion of the encrypted data in the client memory and the server provides single-copy serializable transaction semantics for distributed transactions, each client sends from the client network interface to the server an encrypted description of a transaction, as encrypted by the encryption portion of the client.

2. The system as described in claim 1 wherein the timing mechanism includes an encrypted transaction log.

3. The system as described in claim 2 wherein the timing mechanism includes a serializability mechanism which makes it appear as if each transaction occurs one at a time and in an order consistent with the encrypted transaction log.

4. The system as described in claim 3 wherein the serializability mechanism utilizes a hash chain.

5. The system as described in claim 4 wherein when the client processing unit desires to perform a transaction entailing updates to data in the server memory, the client network interface sends an encoding of the transaction and the updates to the server; the server then sends information about other transactions to the client which the client processing unit checks for a conflict between the transaction and the other transactions; with the client network interface sending a commit message to the server regarding the transaction if there are no conflicts.

6. The system as described in claim 5 wherein the client processing unit detects conflicts by parsing and comparing SQL statements.

7. The system as described in claim 5 wherein the processing unit appends to the commit message a last value in the hash chain encoding all previous updates.

8. The system as described in claim 7 wherein the client processing unit verifies that a value of a hash chain received from other clients matches the other clients' own computation of the value of the clients' hash chain.

9. The system as described in claim 1 wherein the client processing unit recovers data in the client memory by obtaining and applying data from the server memory.

10. The system as described in claim 1 wherein the client network interface imports a large object which the client processing unit modifies, and the client network interface sends the hash value of the modified object in updates to the server.

11. A client of a storage system comprising:
a client memory in which data is stored;
an encryption portion which encrypts and decrypts the data;
a client processing unit in communication with the memory which stores the data in the client memory according to code the processing unit executes; and
a client network interface in communication with the client memory through which a request for a required slot in an encrypted transaction log of a server is sent to the server and through which an allocate transaction slot response from the server is received, the server cannot infer which data is accessed by the clients because clients perform read transactions only locally in the client's client memory and cannot infer whether two transactions from the clients access a same portion of the encrypted data in the client memory and the server provides single-copy serializable transaction semantics for distributed transactions, each client sends from the client network interface to the server an encrypted description of a transaction, as encrypted by the encryption portion of the client.

12. A server of a storage system comprising:
a server memory in which encrypted data from clients is stored and shared, said server memory having an encrypted transaction log, the encrypted data not able to be decrypted by the server, the server cannot infer which data is accessed by the clients because clients perform read transactions only locally in the client's client memory and cannot infer whether two transactions from the clients access a same portion of the encrypted data in the client memory and the server provides single-copy serializable transaction semantics for distributed transactions, each client sends from a client network interface to the server an encrypted description of a transaction, as encrypted by an encryption portion of the client;
a server processing unit in communication with the server memory; and
a server network interface which receives a request for required slot in the transaction log from a client through which an allocate transaction slot response is sent to the client.

13. A method for storing data comprising the steps of:
sending an encrypted encoding of a transaction entailing updates to data a client processing unit of a client desires to perform from a client network interface of the client through a network to a server, the server unable to decrypt the encoding, the server cannot infer which data is accessed by the clients because clients perform read transactions only locally in the client's client memory and cannot infer whether two transactions from the clients access a same portion of the encrypted data in the client memory and the server provides single-copy serializable transaction semantics for distributed transactions, each client sends from the client network interface to the server an encrypted description of a transaction, as encrypted by the encryption portion of the client;
sending information about other transactions to the client from a server network interface of the server through the network;
checking with the client processing unit for a conflict between the transaction and the other transactions;
sending a commit message from the client network interface to the server regarding the transaction if there are no conflicts; and
executing the transaction on each client.

14. The method as described in claim 13 including the steps of sharing a server memory of the server by other clients through the network to store copies of encrypted data in the server memory from the clients, the server unable to decrypt the encrypted data stored in the server memory; and ensuring data that is shared is a desired copy with a timing mechanism of the server.

15. A method as described in claim 14 wherein the ensuring step includes the steps of sending a request from the client network interface through the network to the server for a required slot in an encrypted transaction log of the server; and receiving at the client network interface an allocate transaction slot response from the server.

16. The method as described in claim 15 wherein the ensuring step includes the step of causing the transactions to have the effect of occurring in an order consistent with the order of the log.

17. The method as described in claim 16 wherein the checking step includes the step of detecting with the client processing unit conflicts by parsing and comparing SQL statements.

18. The method described in claim 14 including the step of the client processing unit appending to the commit message a last value in a hash chain encoding all previous updates.

19. The method as described in claim 18 including the step of the client processing unit verifying that a value of a hash chain received from other clients matches the other clients' own computation of the value of the clients' hash chain.

20. The method as described in 13 including the step of the processing unit recovering data in the client memory by obtaining and reading and decrypting data from the server memory.

21. The method as described in claim 13 including the steps of the client network interface importing a large object which the client processing unit modifies, and the client network interface sending the hash value of the modified object in updates to the server.

22. The method as described in claim 13 wherein the server cannot determine whether more than one client is accessing data which is the same or a single client accesses data which is the same at different times.

23. The method as described in claim 13 including the step of the clients sending timestamps of a last update to ensure the server has not been withholding updates.

24. A method of a client of a storage system comprising the steps of:
storing data in a client memory according to code a client processing unit executes;
forming a request for a required slot in an encrypted transaction log of a server with an encryption portion;
sending the request to the server through a client network interface, the server cannot infer which data is accessed by the clients because clients perform read transactions only locally in the client's client memory and cannot infer whether two transactions from the clients access a same portion of the encrypted data in the client memory and the server provides single-copy serializable transaction semantics for distributed transactions, each client sends from the client network interface to the server an encrypted description of a transaction, as encrypted by the encryption portion of the client; and
receiving an allocate transaction slot response from the server.

25. A method of a server of a storage system comprising the steps of:
storing encrypted data from clients in a server memory which a server processing unit cannot decrypt, each client sends from a client network interface to the server an encrypted description of a transaction, as encrypted by an encryption portion of the client, the server memory having an encrypted transaction log, the server cannot infer which data is accessed by the clients because clients perform read transactions only locally in the client's client memory;
receiving at a server network interface a request for required slot in the transaction log from a client; and
sending an allocate transaction slot response to the client through the server network interface.

26. A storage system comprising:
a network;
a server having a server network interface in communication with the network, a server processing unit and a server memory for storing data; and
a first client and at least a second client, each client having a client processing unit, a client memory, encryption portion and a client network interface in communication with the network; when the first client desires to perform a deterministic transaction T1 to the server, client sends from the client network interface to the server an encrypted executable description of T1, as encrypted by the encryption portion of the first client, the server network interface sending information about an ordered sequence of deterministic transactions X to the second client, the client processing unit of the second client executing transactions X in the order they were sent to the server from at least the first client, the server cannot infer which data is accessed by the clients because clients perform read transactions only locally in the client's client memory and cannot infer whether two transactions from the clients access a same portion of the encrypted data in the client memory and the server provides single-copy serializable transaction semantics for distributed transactions.

27. The system as described in claim 26 wherein the processing unit of the first client appends to the commit message a last value in a hash chain encoding all previous updates.

28. The system as described in claim 27 wherein the client processing unit of the first client verifies that a value of a hash chain received from other clients matches the other clients' own computation of the value of the clients' hash chain.

29. The system as described in claim 28 wherein the client processing unit of the first client recovers data in the client memory by obtaining and applying data from the server memory.

30. The system as described in claim 29 wherein the client network interface of the first and second clients sends timestamps of a last update to ensure the sever has not been withholding updates.

31. A non-transitory computer readable medium storing a computer program which when executed by at least one client processing unit of a client of a storage system communicates with a server, the computer program comprising instructions for the client processing unit generated steps of:
storing data in a client memory;
encrypting a request for a required slot in an encrypted transaction log of the server; and
sending the encrypted request to the server through a client network interface, the server cannot infer which data is accessed by the clients because clients perform read transactions only locally in the client's client memory and cannot infer whether two transactions from the clients access a same portion of the encrypted data in the client memory and the server provides single-copy serializable transaction semantics for distributed transactions, each client sends from the client network interface to the server an encrypted description of a transaction, as encrypted by the encryption portion of the client.

32. A non-transitory computer readable medium storing a computer program which when executed by at least one server processing unit of a server of a storage system communicates with a client, the computer program comprising instructions for the server processing unit generated steps of:
storing encrypted data from clients in a server memory which the server processing unit cannot decrypt, the server memory having an encrypted transaction log, the server cannot infer which data is accessed by the clients because clients perform read transactions only locally in the client's client memory and cannot infer whether two transactions from the clients access a same portion of the encrypted data in the client memory and the server provides single-copy serializable transaction semantics for distributed transactions, each client sends from a client network interface to the server an encrypted description of a transaction, as encrypted by an encryption portion of the client;
receiving at a server network interface a request for a required slot in the transaction log from the client; and
sending an allocate transaction slot response to the client through the server network interface.

* * * * *